(12) United States Patent
Al-Ibrahim et al.

(10) Patent No.: US 9,671,525 B2
(45) Date of Patent: Jun. 6, 2017

(54) DETERMINING CONTINUOUS CAPILLARY PRESSURE CURVES FOR SUBSURFACE EARTH FORMATIONS USING SATURATION AND NMR LOG DATA

(71) Applicant: Saudi Arabian Oil Company, Dhahran (SA)

(72) Inventors: Mustafa Al-Ibrahim, Safwa (SA); Mokhles Mustapha Mezghani, Dhahran (SA); Johannes Jacobus Buiting, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 917 days.

(21) Appl. No.: 13/790,619

(22) Filed: Mar. 8, 2013

(65) Prior Publication Data

US 2014/0257702 A1  Sep. 11, 2014

(51) Int. Cl.
*G01V 9/02* (2006.01)
*G01V 11/00* (2006.01)
*G01V 3/14* (2006.01)
*G01V 3/32* (2006.01)

(52) U.S. Cl.
CPC .............. *G01V 9/02* (2013.01); *G01V 3/14* (2013.01); *G01V 3/32* (2013.01); *G01V 11/00* (2013.01)

(58) Field of Classification Search
CPC . G01V 9/02; G01V 3/32; G01V 11/00; G01V 3/14
See application file for complete search history.

(56) References Cited

U.S. PATENT DOCUMENTS

| 6,008,645 A * | 12/1999 | Bowers ............... G01V 3/14 250/253 |
| 6,933,719 B2 | 8/2005 | Thomann et al. |
| 6,954,066 B2 * | 10/2005 | Siess ............... G01V 3/32 324/303 |

(Continued)

FOREIGN PATENT DOCUMENTS

WO  9840763 A1  9/1998

OTHER PUBLICATIONS

McCoy et al., "Use of Resistivity Logs to Calculate Water Saturation at Prudhoe Bay", 1997, SPE Reservoir Engineering pp. 45-51.*

(Continued)

*Primary Examiner* — Regis Betsch
(74) *Attorney, Agent, or Firm* — Bracewell LLP; Constance G. Rhebergen; Albert B. Kimball, Jr.

(57) ABSTRACT

Continuous capillary pressure ($P_c$) curves of subsurface rock formations adjacent wells are determined based on translation relaxation time (T2) data from nuclear magnetic resonance (NMR) and from wireline well logs, such as resistivity logs, to obtain water saturation ($S_w$) of the rock in the formations. The T2 data and the hydrocarbon density, water density, free water level, and paleo-water level of the formation are processed to obtain parameters of Thomeer hyperbolas that closely conform to water saturation values obtained from the other well logs. The Thomeer hyperbolas so determined are converted to capillary pressure curves.

23 Claims, 21 Drawing Sheets

(56) References Cited

U.S. PATENT DOCUMENTS

| | | | |
|---|---|---|---|
| 7,277,795 B2 | 10/2007 | Boitnott | |
| 7,356,413 B2* | 4/2008 | Georgi | G01N 24/081 702/11 |
| 7,991,553 B2 | 8/2011 | Alumbaugh et al. | |
| 2005/0206378 A1* | 9/2005 | Hamdan | G01V 3/32 324/303 |
| 2010/0114506 A1 | 5/2010 | Hustad | |
| 2010/0275658 A1 | 11/2010 | Kim et al. | |
| 2010/0313633 A1* | 12/2010 | Anand | G01N 24/08 73/38 |
| 2012/0035851 A1* | 2/2012 | Romero | G01V 3/32 702/8 |

OTHER PUBLICATIONS

Huet et al., "A Modified Purcell/Burdine Model for Estimating Absolute Permeability From Mercury Injection Capillary Pressure Data", 2005, IPTC 10994 1-12.*

Altunbay, M., Capillary Pressure Data From NMR Logs and Its Implications on Field Economics, SPE International SPE 71703, 2001.

Baldwin and Yamanashi, Capillary-Pressure Determinations from NMR Images of Centrifuged Core Plugs: Berea Sandstone, The Log Analyst, Sep.-Oct. 1991.

Gao, Bo, New Method for Predicting Capillary Pressure Curves from NMR Data in Carbonate Rocks, SPWLA 52nd Annual Logging Symposium, May 14-18, 2011.

Glorioso, Juan, Deriving Capillary Pressure and Water Saturation from NMR Transversal Relaxation Times, SPE International, SPE 81057, 2003.

Kleinberg, utility of NMR T2 Distributions, Connection with Capillary Pressure, Clay Effect, and Determination of the Surface Relaxivity Parameter p2, Magnetic Resonance Imaging, vol. 14, Nos. 7/8, pp. 761-767, 1996.

Lowden, B., R2 Relazation Time Versus Mercury Injection Capillary Pressure: Implications for NMR Logging and Rservior Characerisation, SPE International, SPE 50607, 1998.

Ouzzane, M., Application of NMR T2 Relaxation to Drainage Capillary Pressure in Vuggy Carbonate Reservoirs, SPE International, SPE 101897, 2006.

Volokitin, Y. A Practical Approach to Obtain Primary Drainage Capillary Pressure Curves from NMR Core and Log Data, Petrophysics vol. 42 No. 4, Jul.-Aug. 2001, pp. 334-343.

Zhang, C., A Novel Method to Construct Capillary Pressure Curves by Using NMR Log Data and Its Application in Reservoir Evaluation, SPE International, SPE 126735, 2009.

International Search Report and Written Opinion for Related PCT Application PCT/US2014/019779, Nov. 26, 2014.

Timur, Aytekin, An Investigation of Permeability Porosity, and Residual Water Saturation Relationships, Chevron Oil Field Research Company, SWPLA 9th Annual Logging Symposium, 1968.

Glover, J. P. W., Permeability Prediction from MICP and NMR Data Using an Electrokinetic Approach, Geophysics, Jul. 2006 v. 71 No. 4 p. F49-F60.

* cited by examiner

FIG. 10A

Capillary Pressure from Logs Prototype

Data Preparation

NMR Data
- Loaded File: ...s\albrama\Documents\MATLAB\DataL\Test Data\UTMN_NMR.csv
- Well Name: 1: WELL_ID
- Depth: 2: DEPTH — # of Headers: 2
- First T2 Dist: 5: AMP_DIST_1[1] — Load Data | Prepare Data
- Last T2 Dist: 34: AMP_DIST_1[30] — Show Original Data | Show Prepared Data

NMR T2 Range
- Loaded File: ...s\albrama\Documents\MATLAB\DataL\Test Data\UTMN_NMR.csv
- Well Name: 1: WELL_ID — # of Headers: 2
- Minimum T2: 3: T2_MIN — Load Data | Prepare Data
- Maximum T2: 4: T2_MAX — Show Original Data | Show Prepared Data

Water Contact Data
- Loaded File: ...DataL\TestData\UTMN_FWL_PFWL_Averages_FinalResuts.csv
- Well Name: 1: Well_ID — # of Headers: 1
- FWL: 2: FWL — Load Data | Prepare Data
- Paleo-WL: 5: PFWL — Show Original Data | Show Prepared Data

Capillary Pressure Calculation
- NMR-PC  Project Name   Linux Username: albraham
- PER-PC  U2   Linux Pass [Update]

Results Visualization
- Well Name: All Analyzed Wells — Histogram Plot (Prop 1)
- Property 1: 4: g1 — Wireline Plot (Prop 1)
- Property 2: 5: g2 — Cross Plot (Prop 1 & Prop 2)
- Depth: Select a well — Pc Plot Showing U2 NMR Analysis Results

| | well_name | md_depth | tvdss_depth | g1 | g2 | g3 |
|---|---|---|---|---|---|---|
| 1 | UTMN_1383_0 | 7040 | 6.1450e+03 | 0.8325 | 0.3225 | 0.1505 |
| 2 | UTMN_1383_0 | 7.0406e+03 | 6.1456e+03 | 0.9974 | 0.3909 | 0.0500 |
| 3 | UTMN_1383_0 | 7.0413e+03 | 6.1462e+03 | 0.9912 | 0.2850 | 0.0500 |
| 4 | UTMN_1383_0 | 7.0419e+03 | 6.1469e+03 | 0.7579 | 0.2869 | 0.2224 |
| 5 | UTMN_1383_0 | 7.0425e+03 | 6.1475e+03 | 0.5643 | 0.8000 | 0.3964 |

FAL Data
Loaded File: ...lbrama\Documents\MATLAB\DataL\Test Data\UTMN_PHI_SW.csv

| Well Name | 1: WELL | | |
|---|---|---|---|
| Depth (MD) | 2: DEPTH | # of Headers: 2 | ◄ ▯ ► |
| Porosity | 5: PHIT_1 | Load Data | Prepare Data |
| Sw | 6: SWT_1 | Show Original Data | Show Prepared Data |

Deviation Survey Data
Loaded File: ...s\albrama\Documents\MATLAB\DataL\Test Data\UTMN_Dev.csv

| Well Name | 1: WELL_ID | | |
|---|---|---|---|
| Depth (MD) | 2: MD | # of Headers: 1 | ◄ ▯ ► |
| TVDSS | 6: TVDSS | Load Data | Prepare Data |
| | | Show Original Data | Show Prepared Data |

Permeability Data
Loaded File:

| Well Name | No Data Loaded | | |
|---|---|---|---|
| Depth (MD) | No Data Loaded | # of Headers: | ◄ ▯ ► |
| Permeability | No Data Loaded | Load Data | Prepare Data |
| | | Show Original Data | Show Prepared Data |

1. Compile Data
2. Send to Linux
3. Read Output

Do it All at Once

Ready

Property Inspector
Well Name: All Analyzed Wells
Property: g1

| Minimum | 0.1000 | STD | 0.3947 |
| Average | 0.6265 | Median | 0.7579 |
| Maximum | 1.0792 | Mode | 0.1000 |

Control Panel
Open Project Folder

Exit

Mokhles Mezghani and Mustafa Al Ibrahim
Contact: mokles.mezghani@aramco.com

| bv1 | bv2 | bv3 | logpd1 | logpd2 | logpd3 | sw_thomeer |
|---|---|---|---|---|---|---|
| 0 | 0 | 0.0875 | 1.1672 | 2.4136 | 3.4471 | 0.420 |
| 0 | 0 | 0.0988 | 1.1331 | 2.4614 | 3.6912 | 0.388 |
| 0.0135 | 0 | 0.0702 | 1.0146 | 2.3579 | 3.6964 | 0.436 |
| 0 | 0 | 0.0856 | 1.1594 | 2.3892 | 3.5077 | 0.532 |
| 0 | 0.0275 | 0.0664 | 1.1394 | 2.7500 | 3.7872 | 0.707 |

DETERMINING CONTINUOUS CAPILLARY PRESSURE CURVES FOR SUBSURFACE EARTH FORMATIONS USING SATURATION AND NMR LOG DATA

BACKGROUND OF THE INVENTION

1. Field of the Invention

The present invention relates to determination of continuous capillary pressures for rock in subsurface formations from well logs.

2. Description of the Related Art

Capillary pressure is an important input to reservoir simulators. Unfortunately, its determination using current traditional methodologies, namely mercury injection capillary pressure experiments, has been relatively expensive, slow, and not environmentally friendly. Because of that and the fact that physical rocks from the subsurface were required, only sparse data points have usually been analyzed. Engineers were then forced to populate their models with a handful of curves or use curves from analogous reservoirs. This, in turn, could lead to gross errors in the simulation results if a proper petrophysical classification of rocks had not been conducted.

The use of nuclear magnetic resonance (NMR) to obtain capillary pressure curves have been investigated in the past. Results were encouraging if a laboratory measured NMR response is used. However, the use of a NMR wireline response has been questionable due to numerous complexities, such as the existence of a hydrocarbon effect. In addition, calibration of NMR derived capillary pressure curves usually required physical rock samples which was sometimes undesirable for cost reasons. Current NMR based methods have also, so far as is known, generally required calibration using methods such as mercury injection capillary injection (MICP) experiments which were constraining in terms of time, money and the number of samples.

SUMMARY OF THE INVENTION

Briefly, the present invention provides a new and improved computer implemented method of obtaining measures in a data processing system of capillary pressure of a formation in a subsurface reservoir. The computer implemented method receives nuclear magnetic resonance well log data from measurements obtained from the formation by a nuclear magnetic resonance log from the well. The method also receives well log data regarding the water saturation of the formation from measurements obtained from the formation by a well log from the well. The computer implemented method then determines an initial measure of capillary pressure of the formation based on the nuclear magnetic resonance well log data, and performs a calibration of the initial measure of capillary pressure of the formation to a postulated capillary pressure of the formation based on the water saturation well log data from the formation.

The present invention also provides a new and improved data processing system for obtaining measures in a data processing system of capillary pressure of a formation in a subsurface reservoir. The data processing system includes a processor which receives nuclear magnetic resonance well log data from measurements obtained from the formation by a nuclear magnetic resonance log from the well, and also receives well log data regarding the water saturation of the formation from measurements obtained from the formation by a well log from the well. The processor determines an initial measure of capillary pressure of the formation based on the nuclear magnetic resonance well log data, and performs a calibration of the initial measure of capillary pressure of the formation to a postulated capillary pressure of the formation based on the water saturation well log data from the formation. The data processing system also includes an output display which forms a display of postulated capillary pressure of the formation.

The present invention also provides a new and improved data storage device which has stored in a computer readable medium computer operable instructions for causing a data processing system to obtaining measures in a data processing system of capillary pressure of a formation in a subsurface reservoir. The instructions stored in the data storage device cause the data processing system to receive nuclear magnetic resonance well log data from measurements obtained from the formation by a nuclear magnetic resonance log from the well, and to receive well log data regarding the water saturation of the formation from measurements obtained from the formation by a well log from the well. The instructions also cause the data processing system to determine an initial measure of capillary pressure of the formation based on the nuclear magnetic resonance well log data, and to perform a calibration of the initial measure of capillary pressure of the formation to a postulated capillary pressure of the formation based on the water saturation well log data from the formation.

DETAILED DESCRIPTION OF THE PREFERRED EMBODIMENTS

I. Capillary Pressure Principles

Figure 1:
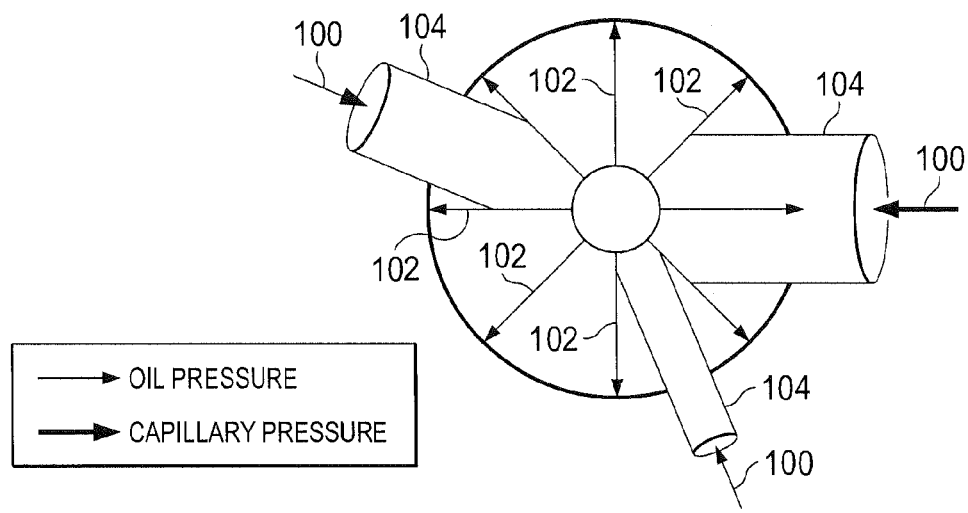
FIG. 1 is a schematic diagram illustrating capillary pressure principles.

At the outset, by way of introduction, an explanation of capillary pressure principles is provided. Capillary pressure is the pressure difference between the interface of two fluids, one being wetting and the other non-wetting. Capillary pressure is proportional to the work required to expel a fluid from pores such as in a reservoir. FIG. 1 is an illustration of the capillary pressure concept. Capillary pressure can be thought of as a force indicated by arrows 100 acting on a body containing hydrocarbon fluids that prevents hydrocarbon under pressure indicated by arrows 102 from leaving the pore at pore-throats, such as those indicated at 104. The larger the pore-throat 104, the smaller the capillary pressure value for it.

Figure 2:
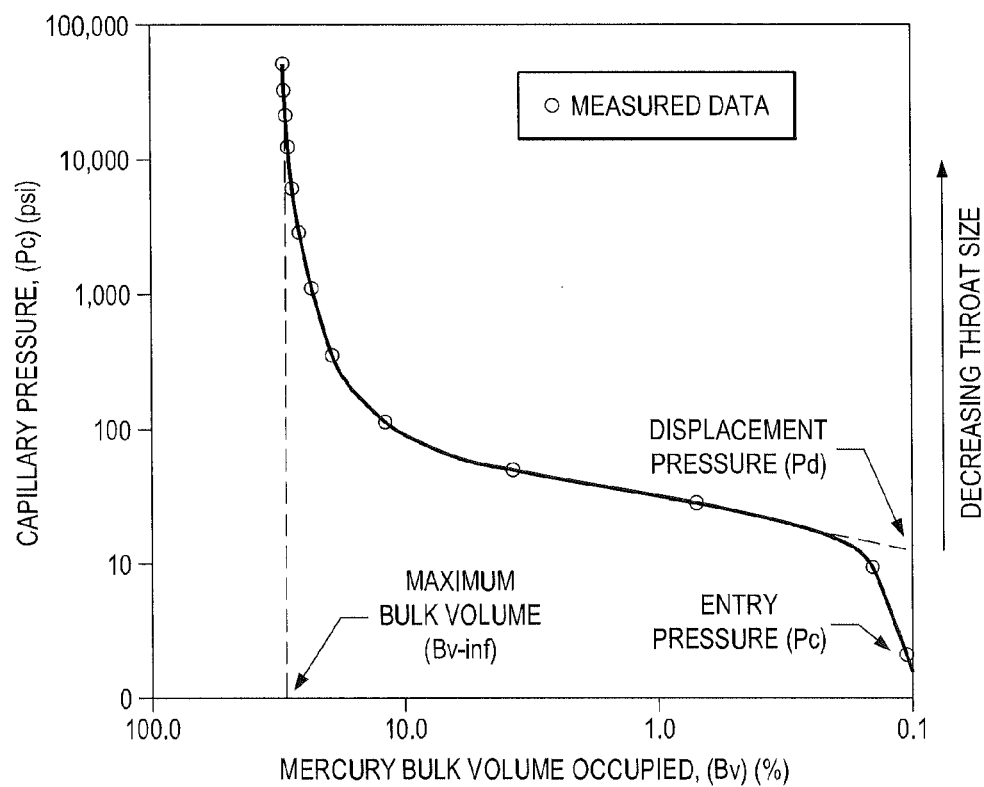
FIG. 2 is a schematic diagram of a typical mercury injection capillary pressure (MICP) curve plot.

Capillary pressure has traditionally been measured by what are known as mercury injection capillary pressure (MICP) experiments. A plot from a MICP experiment of the pressure versus the percentage of the injected mercury produces what is known as a capillary pressure curve. FIG. 2 is a schematic diagram of a typical mercury injection capillary pressure (MICP) curve plotted on a log-log scale. The MICP experiment uses a mercury-air system fluid system while an oil-water system actually exists in the reservoir. A conversion, which depends on the properties of the fluids, is used to convert between the two systems.

Figure 3:
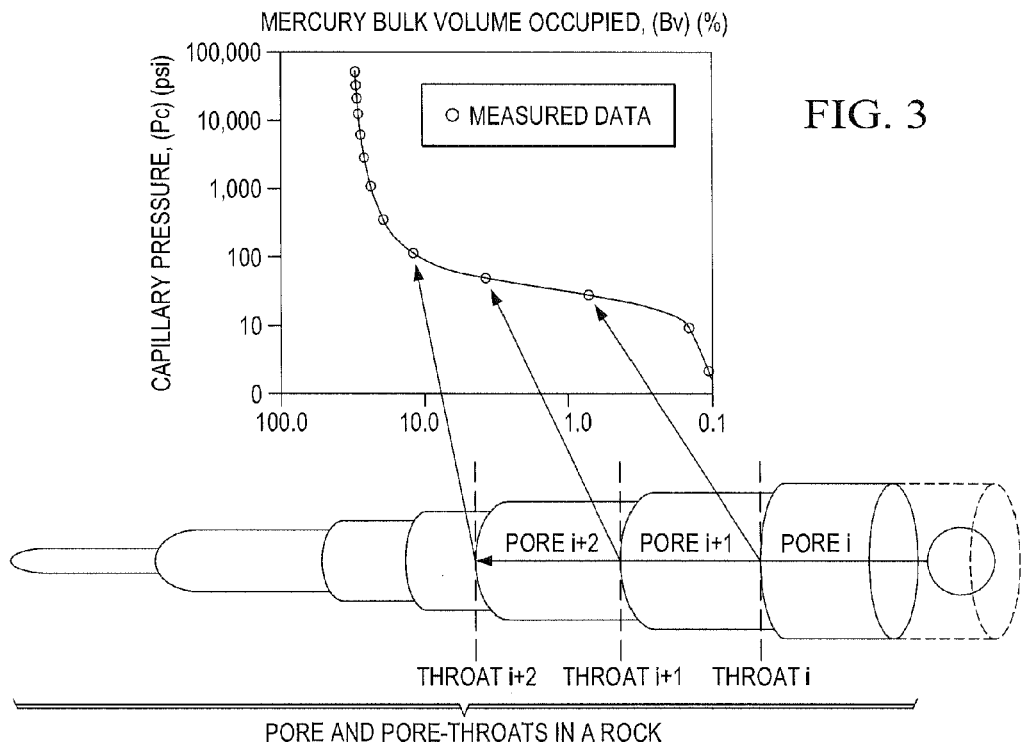
FIG. 3 is a schematic diagram illustrating the relation of a capillary pressure curve to pores in formation rock.

In an MICP experiment, mercury is pushed through the porous media. The mercury enters the pores with the largest throats first, while pressure remains relatively constant. The pressure is then increased and more mercury is injected, thereby entering pores with smaller throats. Effectively, one can consider the porous media as a series of connected cylinders. FIG. 3 is a schematic view of how a capillary pressure curve is visualized. The pores are approximated by tubes and sorted in decreasing throat size (i.e. diameter). Each pore will act as a throat for the next pore with larger diameter. This consideration assumes that the rock is well connected, which may not always be the case.

The Washburn equation is traditionally used to convert capillary pressure results to pore-throats distributions. The equation uses Darcy's Law and assumes cylindrical conduits. Equation 1 gives this relationship expressed in the Washburn equation, where $P_c$ is capillary pressure, d is throat diameter, $\gamma$ is interfacial tension and $\tau$ is contact angle.

$$P_c = \frac{-4\gamma \cos(\tau)}{d} \quad (1)$$

MICP experiments are, as noted, conducted in a mercury-air system. Results can be converted to a hydrocarbon-water system. Equation 2 shows this conversion, where $Pc_{hw}$ is the capillary pressure in the hydrocarbon-water system, $\gamma_{hw}$ is the interfacial tension between the hydrocarbon and water, $\gamma_{ma}$ is the interfacial tension between mercury and water, $\tau_{hw}$ is the contact angle between the hydrocarbon and water, $\tau_{ma}$ is the contact angle between the mercury and air, and $Pc_{ma}$ is the capillary pressure value in the mercury-air system.

$$Pc_{hw} = \frac{\gamma_{hw}}{\gamma_{ma}} \times \frac{\cos(\tau_{hw})}{\cos(\tau_{ma})} \times Pc_{ma} \quad (2)$$

A somewhat similar, but different, experiment is what is known as the constant rate mercury injection, also known as CRMI or APEX experiment. By maintaining a relatively constant injection rate, sudden drops of measured pressures can be interpreted as mercury entering the pores. Overall, as the experiment continues, the injection pressure increases due to mercury entering smaller and smaller pores. Results are showed as distribution of pore-bodies and pore-throats. One disadvantage of using this method is that it does not reach high pressures, with the maximum pressure being on the order of a few thousands psi compared to the tens of thousands psi in an MICP experiment.

II. Nuclear Magnetic Resonance (NMR)

Figure 4:
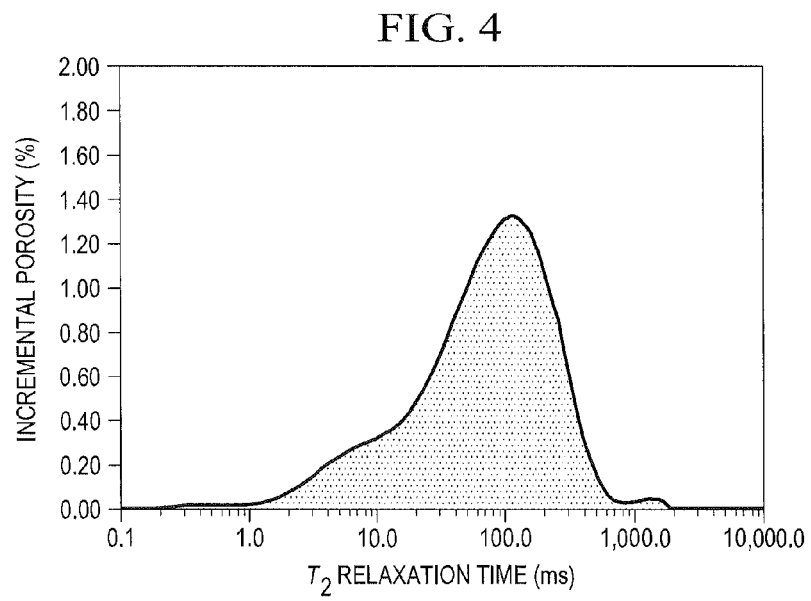
FIG. 4 is a plot of relaxation time measured by a nuclear magnetic resonance (NMR) logging tool at an example depth in a well.

Nuclear Magnetic Resonance (NMR) is a technique used in well logs which measures the response of hydrogen nuclei (protons) to an induced magnetic field (M). Hydrogen nuclei become polarized when a magnetic field is turned on and then relax after the field is turned off. The relaxation time is measured using the NMR logging tool. FIG. 4 shows a typical relaxation time plot for a given depth. The y-axis is converted from amplitude values to incremental porosity by calibration with other data by known techniques.

Hydrogen nuclei in minerals relax at a very fast rate of 10-100 μs because they are not easily polarized by the induced magnetic field. This means that, effectively, the NMR tool measures only fluid effects, and accordingly, pores. Typically, a relaxation time plot is divided into three parts: clay-bound water, capillary-bound water, and producible fluids.

Figure 5:
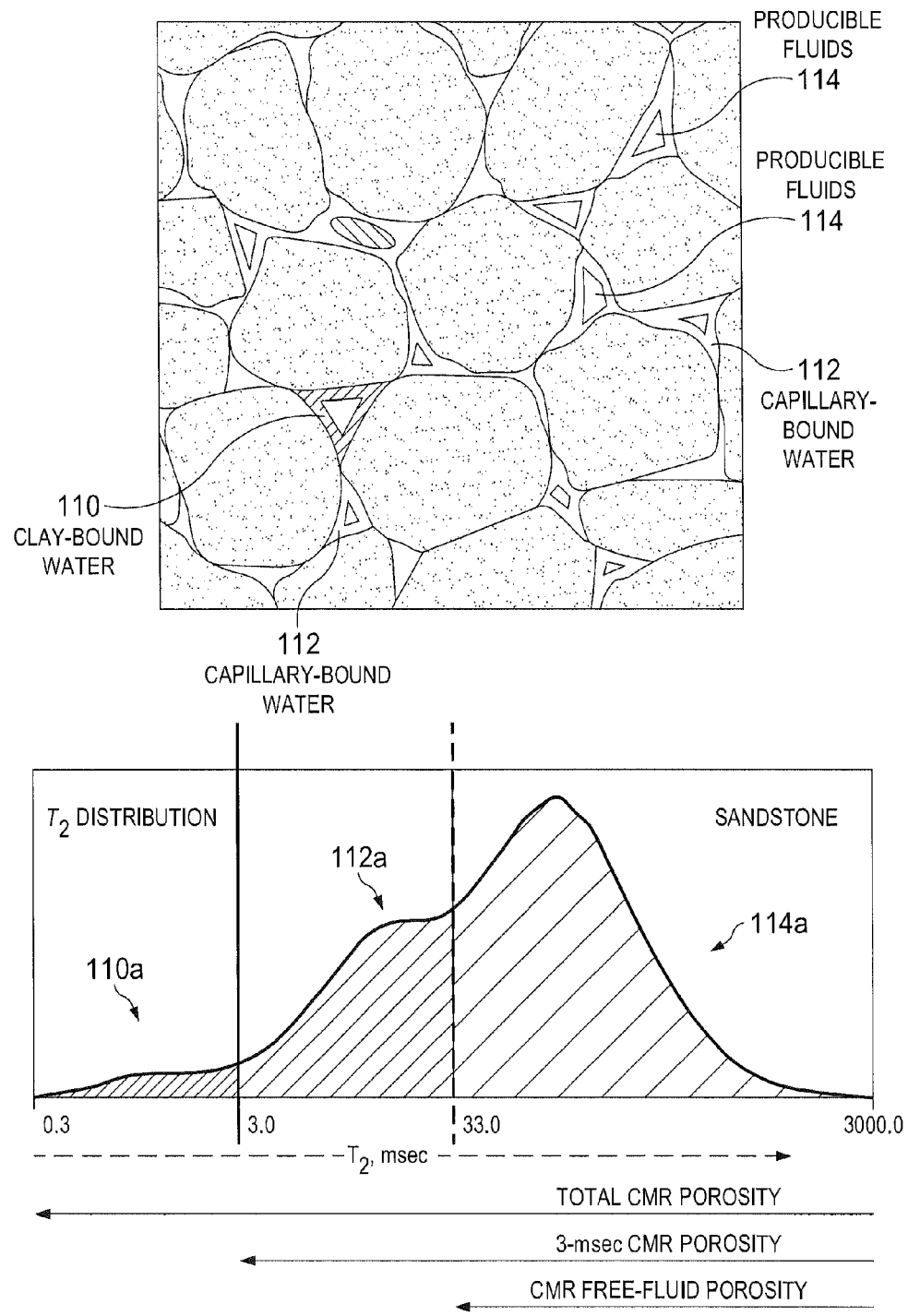
FIG. 5 is a schematic diagram illustrating the relation between NMR relaxation time measurements and fluid present in formation rock.

FIG. 5 illustrates a typical interpretation of an NMR relaxation time for rock bound fluids. Clay-bound water as indicated at 110 in rock has a very short relaxation time as indicated at 110a in the relaxation plot. Capillary-bound water as indicated at 112 responds as indicated in a time segment 112a starting at 3.0 msec in the relaxation time plot. Producible hydrocarbon fluids indicated at 114 in rock have a longer relaxation time as indicated at 114a starting from 33 msec.

Figure 6:
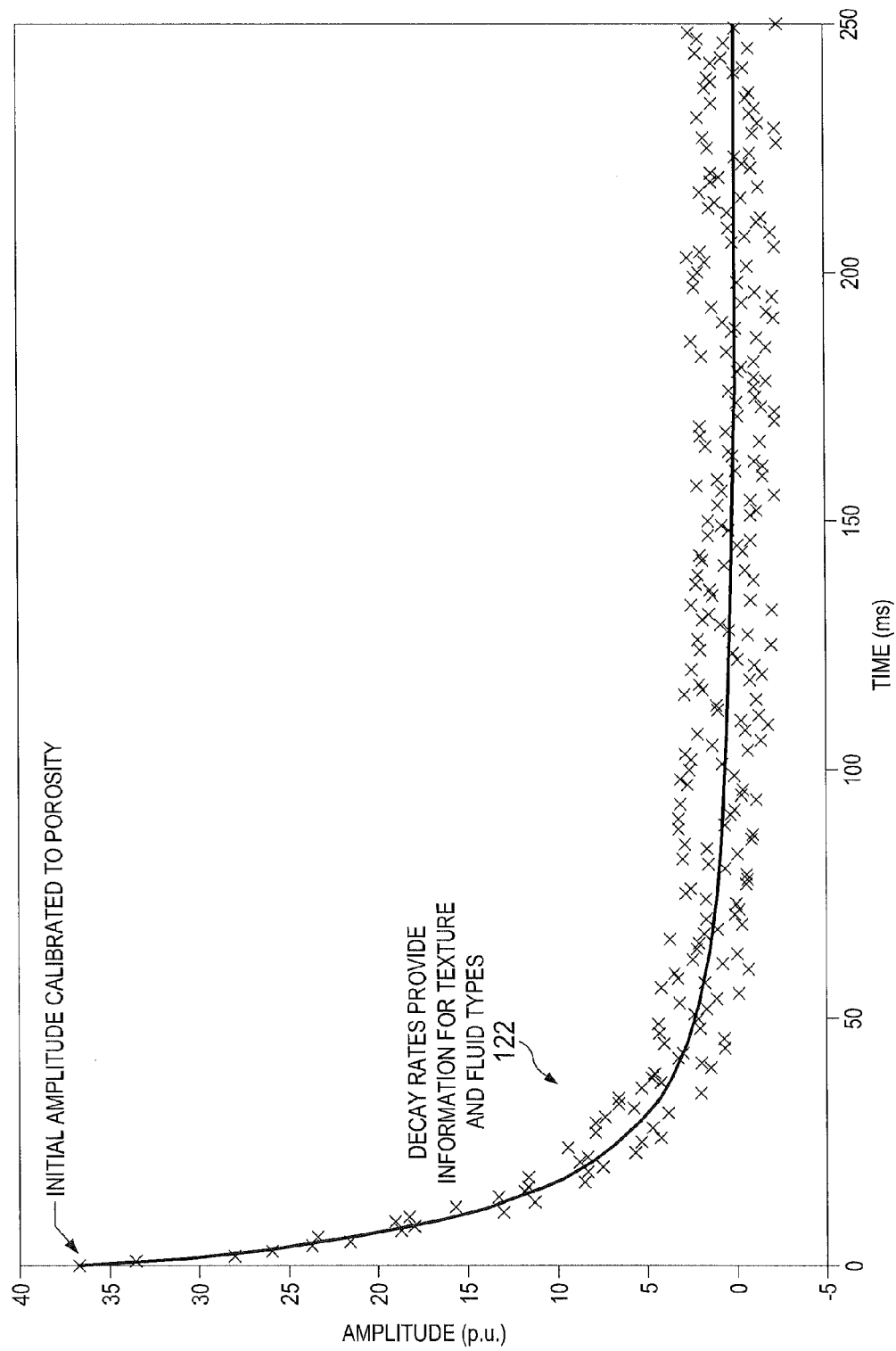
FIG. 6 is an example plot of a spin echo decay function as a function of time.
Figure 7:
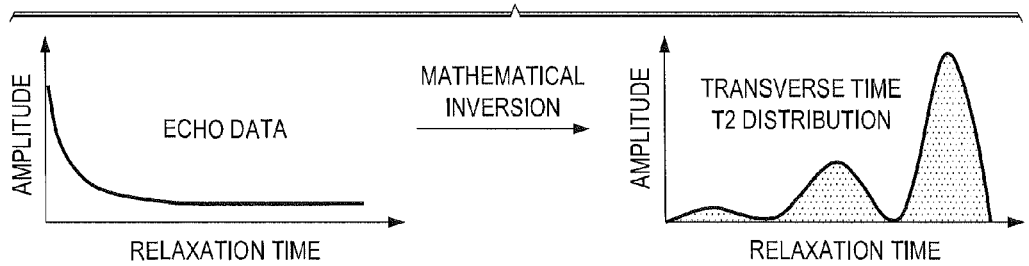
FIG. 7 is a schematic diagram illustrating conversion an echo decay function to a measure of relaxation time.

Two relaxation values are measured: longitudinal relaxation time $T_1$ and transverse relaxation time $T_2$. They are measured as a multi-exponential decay of the signal governed by Equation 2A. FIG. 6 is an example of a spin echo decay function measured after turning off the induced magnetic field from an NMR logging tool. As indicated at 120, the decay function has an initial amplitude which can be calibrated to porosity. Decay rates indicated at 122 provide information for rock fracture fluid types. It is to be noted that Equation 2A assumes that the internal gradient effects are negligible. Mathematical inversion is used to convert the echo data into relaxation time as indicated schematically in FIG. 7.

$$M(t) = M_a(t) \sum_{i=1}^{N} A_i \exp\left(\frac{-t}{T_i}\right) \qquad (2A)$$

where M(t) is the magnetization field strength, $A_1$ is the volume fraction of pores of size i, t is time after the induced magnetization is turned off, and $T_1$ is the time constant associated with these pores.

Generally, two effects contribute to the longitudinal relaxation time: surface relaxation and bulk relaxation. Surface relaxation occurs due to colliding of the hydrogen nuclei with the surface of the grain. Bulk relaxation occurs due to hydrogen atoms colliding with each other. In addition to surface and bulk effects, diffusion effects also contribute to the transverse relaxation time. Diffusion relaxation is occurs due to the loss of energy while the hydrogen is moving in the fluid.

The rates of these effect combined result in the total $T_2$ relaxation time. Equation 3 give the mathematical expression for the total rate $(1/T_2)$ with the first, second, and third terms being rates of surface, bulk, and diffusion relaxation respectively.

$$\frac{1}{T_2} = \rho_2 \frac{S}{V} + \frac{1}{T_{2Bulk}} + \frac{(\gamma GT)^2 D}{12} \qquad (3)$$

where $T_2$ is the transverse relaxation time, $\rho_2$ is the relaxivity for the transverse spin, S is the surface area of the grains, V is the volume of the grains, $T_{2Bulk}$ is the transverse bulk relaxation time, $\gamma$ is the gyromagnetic ratio of a proton, G is the gradient strength. T is the time between spin echoes, and D is the molecular diffusion coefficient.

Because the longitudinal time is generally larger than the transverse one, the transverse relaxation time is more appropriate for wireline log analysis. This is because measurements are made while the logging tool is moving (usually upwardly) at some speed which may prevent the tool from capturing the total longitudinal relaxation response.

Two concepts related to surface relaxation: the relaxivity $\rho_2$ and the surface-to-volume ratio (S/V) are utilized for the purposes of the present invention. The relaxivity value reflects the ability of the grain to cause the hydrogen nuclei to relax, which depends on the grain intrinsic characteristics. The surface-to-volume ratio depends on the geometry and size of the grains. It is commonly believed that surface relaxation has the most important influence on the $T_2$ value, and thus, $T_2$ reflects the pore size distribution. If the bulk and diffusion effects are ignored, Equation 3 is simplified to Equation 4.

$$\frac{1}{T_2} \approx \rho_2 \frac{S}{V} \qquad (4)$$

III. Conversion from NMR to Capillary Pressure

Pore-bodies and pore-throats are represented by an interrelation between NMR and capillary pressure or Pc data. NMR reflects pore-body, with the transverse time $T_2$ reflecting pore-body distribution if the porous media is fully brine saturated. Capillary pressure, on the other hand, reflects pore-body and pore-throat distributions. The bulk volume is controlled by the pore-body distribution while the value of the capillary pressure is controlled by the pore-throats, as seen from the Washburn equation, Equation (1).

Traditionally, MICP data has been used to obtain a calibration factor between the NMR derived capillary pressure curve and the laboratory one. The calibration factor obtained is then applied to a defined interval of the same petrophysical rock type. Calibration using MICP data has been considered the most reliable because the MICP data itself is relatively reliable. In addition, a multi-point calibration can be done since more than one point of Pc-Sw is available. Unfortunately, MICP data requires the existence of physical rocks and they are relatively expensive to obtain and slow to analyze. Thus, their availability to perform such calibration is limited. In addition, the difference in scale, plug or chip size for MICP and the typical half a foot for NMR data may render the calibration unreliable.

A pseudo-MICP data can be used for calibration. Images and models can be used to obtain pseudo-MICP curves using fluid simulation or geometrical calculations. The calibration factor obtained is then applied to a defined interval. Calibration in this case is also multi-point. The method again requires a physical rock sample. Pseudo-MICP data can be inaccurate depending on the model quality. Still, because it is relatively fast and inexpensive, it can be done on a larger number of samples than the laboratory MICP experiments.

IV. Thomeer Modeling of Capillary Pressure Curves

Thomeer originally suggested the use of hyperbola to model the shape of the capillary pressure curve. The expression used is defined by Equation 4A. A multi-pore system can be modeled by combining more than one hyperbola. Each hyperbola has its own three parameters.

$$\log(e^{-C}) = \log\left(\frac{B_v}{B_\infty}\right) \times \log\left(\frac{P_c}{P_d}\right) \qquad (4A)$$

where G is the shape factor, $B_v$ is the cumulative bulk percentage, $B_\infty$ is the maximum mercury bulk percentage reached, $P_c$ is the capillary pressure and $P_d$ is the entry pressure, i.e., the pressure when mercury enters the largest throat. Thus, each Thomeer hyperbola can be defined by three values: G, $B_v$, and $P_d$. This is a convenient way of defining the capillary pressure curve since it is a mathematically understandable.

Figure 8:
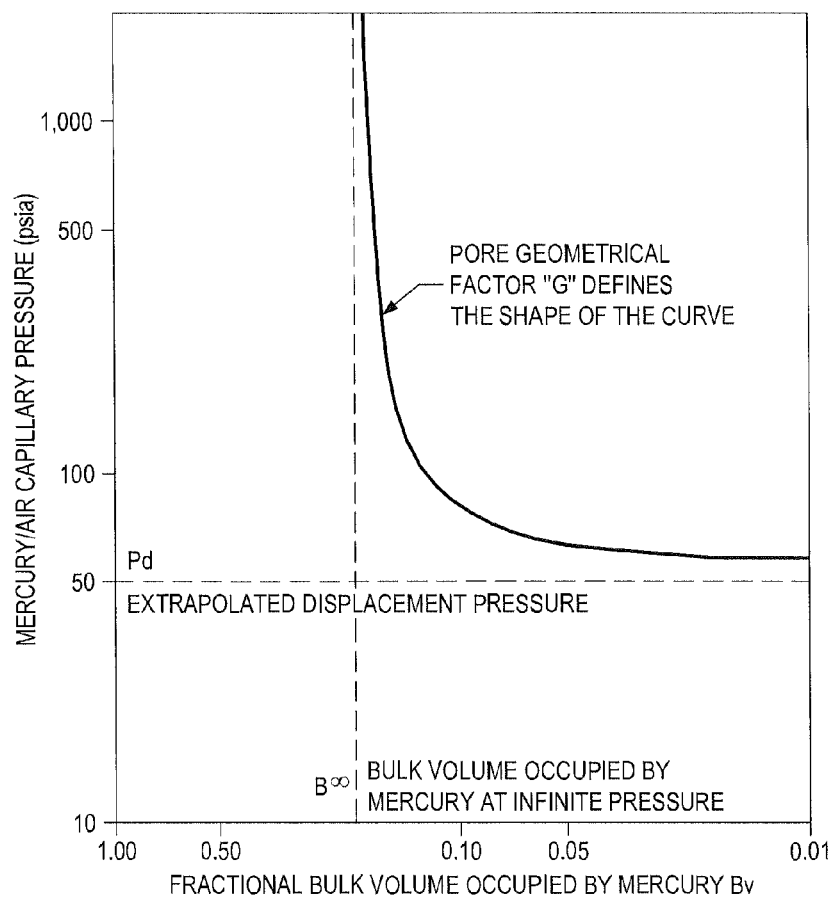
FIG. 8 is a schematic diagram of an example Thomeer hyperbola for capillary pressure.

FIG. 8 is an example of a Thomeer hyperbola. Note that $B_v$ defines the vertical asymptotes, $P_d$ defines the horizontal asymptotes as indicated at 130, and G defines the general shape of the curve as indicated at 132.

V. Optimization

Mathematical optimization is used according to the present invention in order to determine the best values for a number of Thomeer hyperbola. Non-linear optimization (or non-linear programming (NLP) is one form of optimization, where a system is solved for unknown variables by minimizing or maximizing an objective function. A non-linear equation of the form shown in Equation 5 can be solved by sequential quadratic programming. x is an n-dimensional parameter vector. It is assumed that f(x), g_j (x), j=1, . . . , m are continuously differentiable.

$$\min f(x)$$
$$x \in R^n:$$
$$g_j(x)=0, j=1, \ldots, m_e$$
$$g_j(x) \geq 0, j=m_e+1, \ldots, m$$
$$x_l \leq x \leq x_u \quad (5)$$

If the problem is not too large, the functions and the gradients can be evaluated with sufficiently high precision, and the problem is smooth and well-scale. Sequential quadratic programming, or SQP, is the standard general purpose methods to solve the optimization problem stated in Equation 5.

The basic methodology is to formulate and solve a quadratic programming sub-problem in each iteration which is obtained by linearizing the constraints and quadratically approximating the Lagrangian function (Equation 6) where x is the primal variable and $u=(u_1; : : : ; u_m)^T$ the Lagrange multiplier vector.

$$L(x, u) := f(x) - \sum_{j=1}^{m} u_j g_j(x) \quad (6)$$

VI. Methodology

Figure 9:
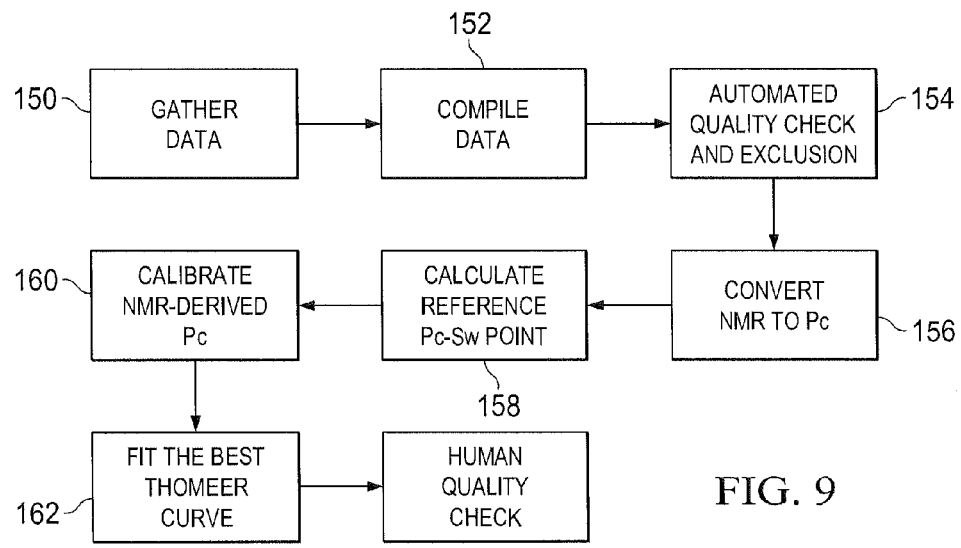
FIG. 9 is a schematic diagram of a process for determining continuous capillary pressure curves according to the present invention.

The methodology used in accordance with the present invention is shown schematically in FIG. 9 and has three basic parts. First, NMR well logging responses are converted into capillary pressure data curves by assuming a link between the pore-body and pore-throats. Next, calibration of the results is done by using a reference point based on measurements obtained from other types of wireline logs. Then, an optimization is performed to obtain the best Thomeer hyperbola fit.

An example code for the NMR to Pc conversion and Thomeer mathematical optimization has been written in Fortran 90 in a Linux environment. A user interface I (FIGS. 10 and 26) of the data processing system D uses a MathWorks MATLAB Environment in the Windows environment to compile inputs, send them for processing, and visualize results.

The user interface I designed specifically for the methodology of the present invention. Raw data is imported and the relevant information is extracted. The information is then compiled and sent to the kernel. The user interface I also allows simple management functions. Execution time depends on number of depth points analyzed but it is relatively fast (about 200 depth points per minute on a relatively old Linux machine). Results are saved in a spreadsheet or other suitable form in memory for further analysis. Finally, results are retrieved and visualized.

Because the kernel of the code is designed on Linux while the interface is designed for Windows, the free Telnet/SSH Client software called Putty was used. Its command line backends (plink and pscp) were integrated into the interface I to allow for Linux code execution and back-and-forth file transfer.

A. Data Compilation

The inputs in step 150 of FIG. 9 are: NMR transverse Relaxation time ($T_2$) amplitude distribution, porosity and water saturation for each depth point of interest, water and hydrocarbon density, hydrocarbon-water interfacial tension and contact angle, and free- and paleo-water levels. These data are gathered as indicated at step 150 in FIG. 9. Deviation surveys are used to convert the driller depth to sub-sea vertical depth automatically and resampling is done as necessary.

The data gathered during step 150 are then compiled as indicated at step 152. The user interface I is as described above designed to load the data (in Comma-Separated Values (CSV) format). The user interface I attempts to identify the relevant data columns automatically. Drop down lists can be used to select the appropriate columns if changes need to be made. After the selection is completed, the required information is extracted and stored in a standard format to be ready for processing. As indicated at step 154, automated quality checks are performed and data of unsatisfactory quality is excluded from further processing.

B. NMR to Pc Conversion

If the relationship between pore-body and pore-throats is simple, i.e. can be defined mathematically, NMR data can be effectively converted during step 156 into capillary pressure curves. Considering the simplified model of $T_2$ distribution presented in Equation 4, and the surface to volume relationship is calculated for the cylindrical system and can be substituted to obtain Equation 7A.

$$\frac{1}{T_2} \approx \rho \frac{2}{r_b} \quad (7A)$$

where $r_b$ is the pore-body radius. Assuming a linear relationship with a slope C between pore-body and pore-throats and substituting the results back into the Washburn equation (Equation 1), a relationship between the $T_2$ distribution and capillary pressure is obtained (Equation 7B) by $$\frac{1}{T_2} \approx \rho \frac{P_c}{4C\gamma\cos(\tau)} \quad (7B)$$

For simplification, a proportionality constant ($\beta$) is used. The proportionality constant $\beta$ encompasses the physical properties and the relationship between the pore-body and pore-throats.

$$\frac{1}{T_2} \approx \beta P_c \quad (8)$$

Figure 11:
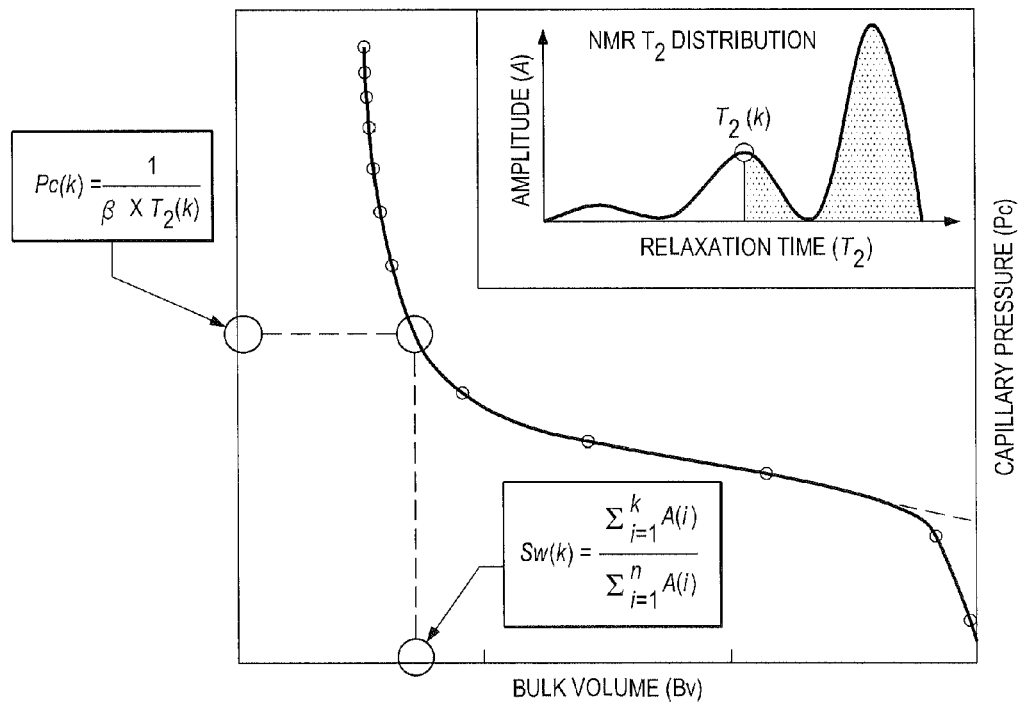
FIG. 11 is a schematic diagram of derivation of capillary pressure curves from NMR relaxation distribution according to the present invention.

Thus, given n points of NMR response data, with transverse relaxation time $T_2$ with amplitude A, the conversion can be made by computer processing during step 158 to determine the reference $P_c$-$S_w$ at point k mathematically by using Equations 9 and 10. FIG. 11 illustrates this conversion.

The $k^{th}$ capillary pressure value is calculated directly by using the proportionality constant β. The water saturation is the percentage of cumulative percentage of the amplitude up to the $k^{th}$ point.

$$P_c(k) = \frac{1}{\beta \times T_2(k)} \quad (9)$$

$$Sw(k) = \frac{\sum_{i=1}^{k} A(i)}{\sum_{i=1}^{n} A(i)} \quad (10)$$

Because the NMR-derived capillary pressure curves generally show similar trends to the raw laboratory MICP data, as opposed to the corrected curve, a correction is preferably made to the NMR data. The correction is applied by identifying the curvature point (which is usually around 2% bulk volume) and extrapolating the data to obtain a new entry pressure. In FIG. 11, capillary pressure curves derivation from NMR relaxation time distribution is illustrated. The x-axis is representative of the cumulative percentage of the amplitude in the relaxation time distribution. The y-axis is the calibrated inverse of the relaxation time.

C. Calibration Factor Estimation

During step 160, the NMR-derived values of $P_c$ are calibrated. The calibration factor β of Equation (8) for this purpose can be problematic. The physical properties of the rock and fluids can be estimated and/or measured. However, the relationship between pore-bodies and pore-throats is difficult to obtain. A number of methods can be used to estimate it. With the present invention, it has been found that the use of existing data from wireline logs as-well-as well tests can be used to determine the calibration factor β.

By taking advantage of existing wireline log analysis, a more direct approach to calibration can be taken. Using conventional logs and other available data, a reference point of Pc-Sw can be obtained. Hydrocarbon and water densities can be obtained by well test measurements. Approximate values can be used if they are not readily available. The reference water saturation ($S_w$) value is taking directly from the wireline log analysis. The reference capillary pressure value is calculated using the concept of capillary pressure from Equation 11.

$$Pc_{ref} = (\rho_w - \rho_o) g \Delta h \quad (11)$$

where $Pc_{ref}$ is the reference capillary pressure value, $\rho_w$ is the density of water, $\rho_o$ is the density of hydrocarbon, g is the gravitational acceleration constant, and Δh is the difference between the current depth and the free water level.

D. Thomeer Modeling of NMR-Derived Capillary Pressure

Thomeer hyperbolas are modeled by computer processing according to the present invention during step 162 through an optimization process that uses three pore systems. The optimization process attempts to minimize the overall difference between the NMR-derived water saturation and the Thomeer hyperbolas derived one.

Figure 12:
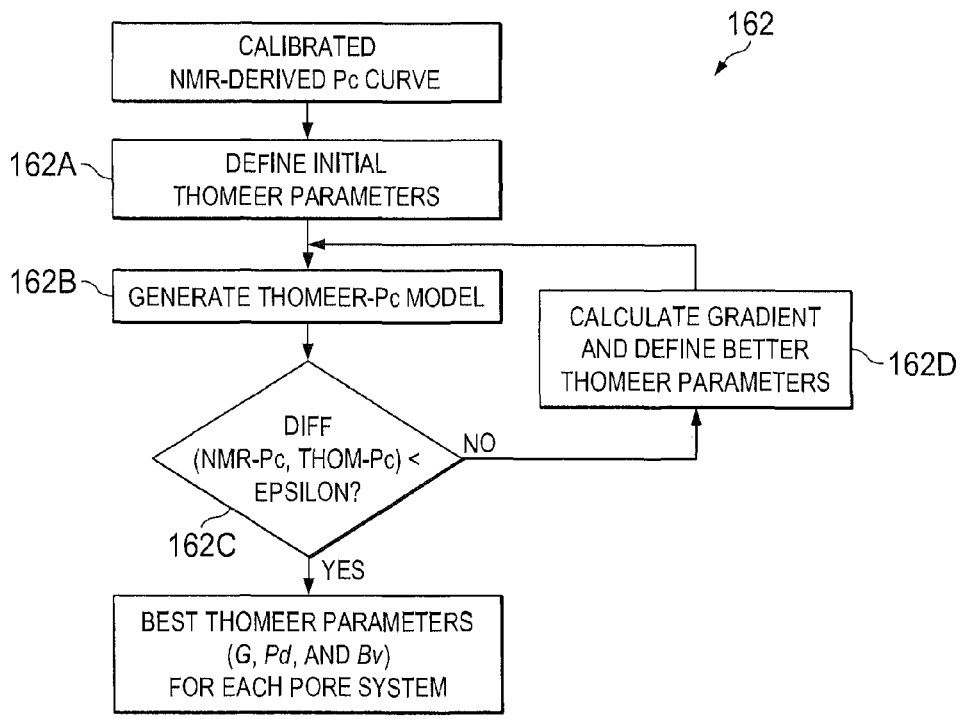
FIG. 12 is a schematic diagram of a process according to the present invention for optimization of a Thomeer hyperbola according to the present invention.

FIG. 12 illustrates in more detail the processing of step 162 for mathematical optimization of the Thomeer curve. To avoid bias in the optimization, extra data points with saturation of values ones or zeros or excluded in the optimization. Only one point for each saturation value (one and zero) are kept. The extra points are the result of the conversion of NMR data with zero amplitude at the start or at the end of the signal. And so, they are artificial and depend heavily on the tool and the acquisition parameters used. Note that, generally, if the fit is very good, the Thomeer model automatically follows these points even though they are not included in the optimization.

The clipped calibrated NMR-derived capillary pressure curve, initial Thomeer parameters are used as indicated at step 162A of FIG. 12 to generate the Thomeer-derived capillary pressure model during step 162B. The difference is then calculated during step 162C using Equation 12. If during step 162C the calculated difference is below a certain value (ε), the gradient is calculated during step 162D, and better Thomeer parameters are defined by reverting to step 162B which generates a new Thomeer-derived model. The cycle continues until the difference is lower than ε, when a set of best Thomeer parameters (G, $B_v$, and $P_d$) are thus identified as indicated at step 162E for each of the pore systems. The three Thomeer parameters are than recorded for each pore system for that particular depth.

$$F(T) = \frac{w}{2}\|Sw_{NMR} - Sw_{Thomeer}\|^2 + \frac{(1-w)}{2}\|T - \bar{T}\|^2 \quad (12)$$

where F(T) is the objective function value at the current Thomeer parameters T, w is the weight function, $Sw_{NMR}$ is the water saturation obtained from NMR.

A three pore system was in an example used to model the capillary pressure curve, meaning that the output will be nine parameters (G, $B_v$, and $P_d$ for each pore system). Table 1 below describes the pore system data used. This data was used to define the ranges and initial value in the optimization.

In addition, a number of constraints (Equations 13, 14, 15, 16, and 17) were defined in order to obtain a sensible result $$Bv_i^{min} \leq Bv_i(Pc) \leq Bv_i^{max} \text{ for } 1 \leq i \leq n \quad (13)$$

$$G_i^{min} \leq G_i \leq G_i^{max} \text{ for } 1 \leq i \leq n \quad (14)$$

$$Pd_i^{min} \leq Pd_i \leq Pd_i^{max} \text{ for } 1 \leq i \leq n \quad (15)$$

$$\text{if } Bv_i(Pc) \neq 0 \text{ then } Bv_{i+1}(Pc) \leq Bv_i(Pc) \text{ for } 1 \leq i \leq n-1 \quad (16)$$

$$Pd_i \leq Pd_{i+1} \text{ for } 1 \leq i \leq n-1 \quad (17)$$

TABLE 1

Ghawar Arab D Limestone porosition parameters

| Gaussian Model | Log($P_d$) | $P_d$ (psi, Hg/air) | Pore-Throat Diameter (microns) | $B_v$ (Porosity Unit) | G | Thomeer permeability (mD) |
|---|---|---|---|---|---|---|
| Porositon M | | | | | | |
| Mean | 0.57 | 3.67 | 58.27 | 17.10 | 0.51 | 202.6 |
| One Standard Deviation | 0.53 | | | 8.36 | 0.19 | |
| Porositon Separator Value | 1.67 | 46.3 | 4.62 | | | |
| Porositon 1 | | | | | | |
| Mean | 2.31 | 204.0 | 1.05 | 5.57 | 0.15 | 0.036 |
| One Standard Deviation | 0.28 | | | 3.18 | 0.13 | |
| Porositon Separator Value | 2.79 | 617.0 | 0.35 | | | |
| Porositon 2 | | | | | | |
| Mean | 3.12 | 1,318.0 | 0.16 | 2.22 | 0.15 | 0.00014 |
| One Standard Deviation | 0.26 | | | 0.87 | 0.13 | |
| Porositon Separator Value | 3.40 | 2,512.0 | 0.09 | | | |
| Porositon 3 | | | | | | |
| Mean | 3.73 | 5,370.0 | 0.04 | 2.22 | 0.15 | 0.00001 |
| One Standard Deviation | 0.20 | | | 0.87 | 0.13 | |
| Porositon Separator Value | 4.78 | 60,000.0 | 0.00 | | | |

E. Data Visualization

After step 162, the processing results are stored in a spreadsheet file (CSV) for further processing. In addition, the user interface I (FIG. 10) allows for visualization of the results for quality check purposes. Histograms, depth plots, cross plots of all the available parameters can be made easily for one or all the wells analyzed. In addition, capillary pressure curves can be easily visualized for any depth points. For further data manipulation, a user can open the results file in a proper spreadsheet program such as Microsoft Excel,

F. Test Results

The methodology of the present invention was applied on a carbonate interval of a large field in the Middle East (Arab-D). The formation consists of vuggy carbonates (limestone and dolomite). In Well A (UTMN 1383), an interval of about 250 feet was examined (6795.13-7042.5 feet of measured depth). Thomeer parameters (ranges and average values) were used from Table 1. The field oil and water densities were used. In addition, the free water level was obtained for each well using the most recent geological model of the field. The paleo-water level was set to be equal to the free water level.

Case 1

Figure 13:
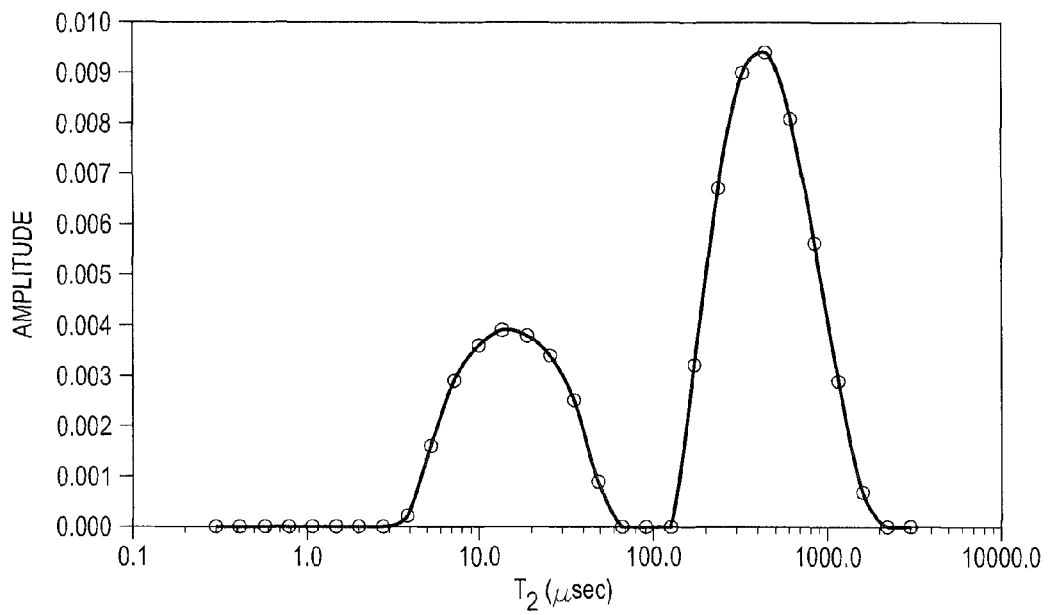
FIG. 13 is a plot of an example bimodal wireline NMR response obtained during field testing according to the present invention.

FIG. 13 shows a bi-modal NMR response with an excellent quality (Case 1). The wireline porosity and water saturation at this depth are 24.92% and 11.74%, respectively. The two pore system does not seem to be coupled, as evident by the lack of signal at around 100 μsec in FIG. 13. The optimized Thomeer parameters obtained from the bi-modal NMR response data of FIG. 13 by the workflow are shown in Table 2.

TABLE 2

| Pore System 1 | | Pore System 2 | | Pore System 3 | |
|---|---|---|---|---|---|
| $Bv_1$ | 0 | $Bv_2$ | 0.2000 | $Bv_3$ | 0.0866 |
| $G_1$ | — | $G_2$ | 0.1852 | $G_3$ | 0.2900 |
| Log $Pd_1$ | — | Log $Pd_2$ | 2.0402 | Log $Pd_3$ | 3.4915 |

Note that the first pore does not exist in the results. This is because the obtained entry pressure for the calibrated NMR-derived capillary pressure is higher than 46.3 psi Hg/Air, the set threshold for Thomeer parameters of Table 1.

Figure 14:
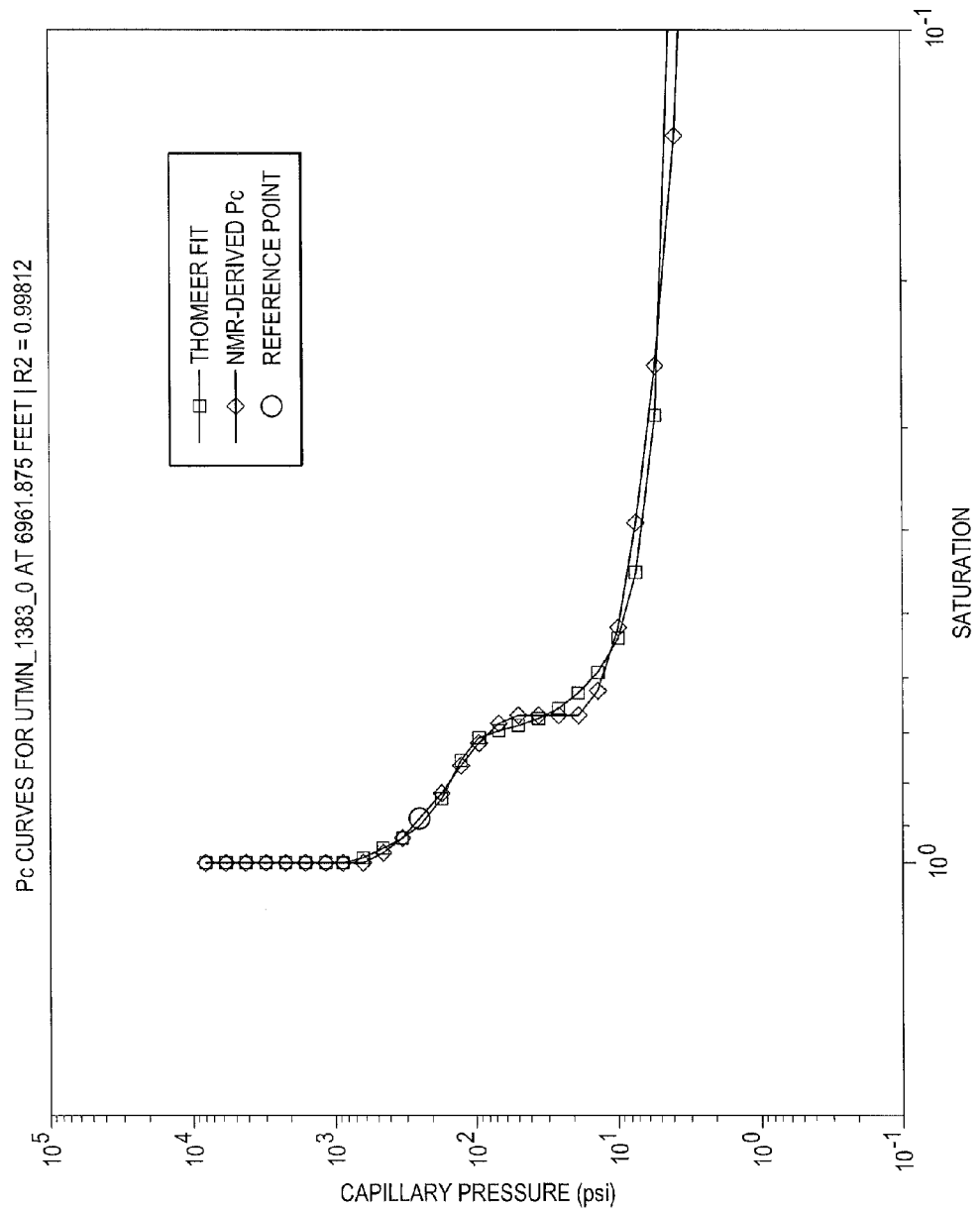
FIGS. 14 and 15 are plots of NMR-derived capillary pressure and an optimized Thomeer fit obtained according to the present invention from the NMR response data of FIG. 13.
Figure 15:
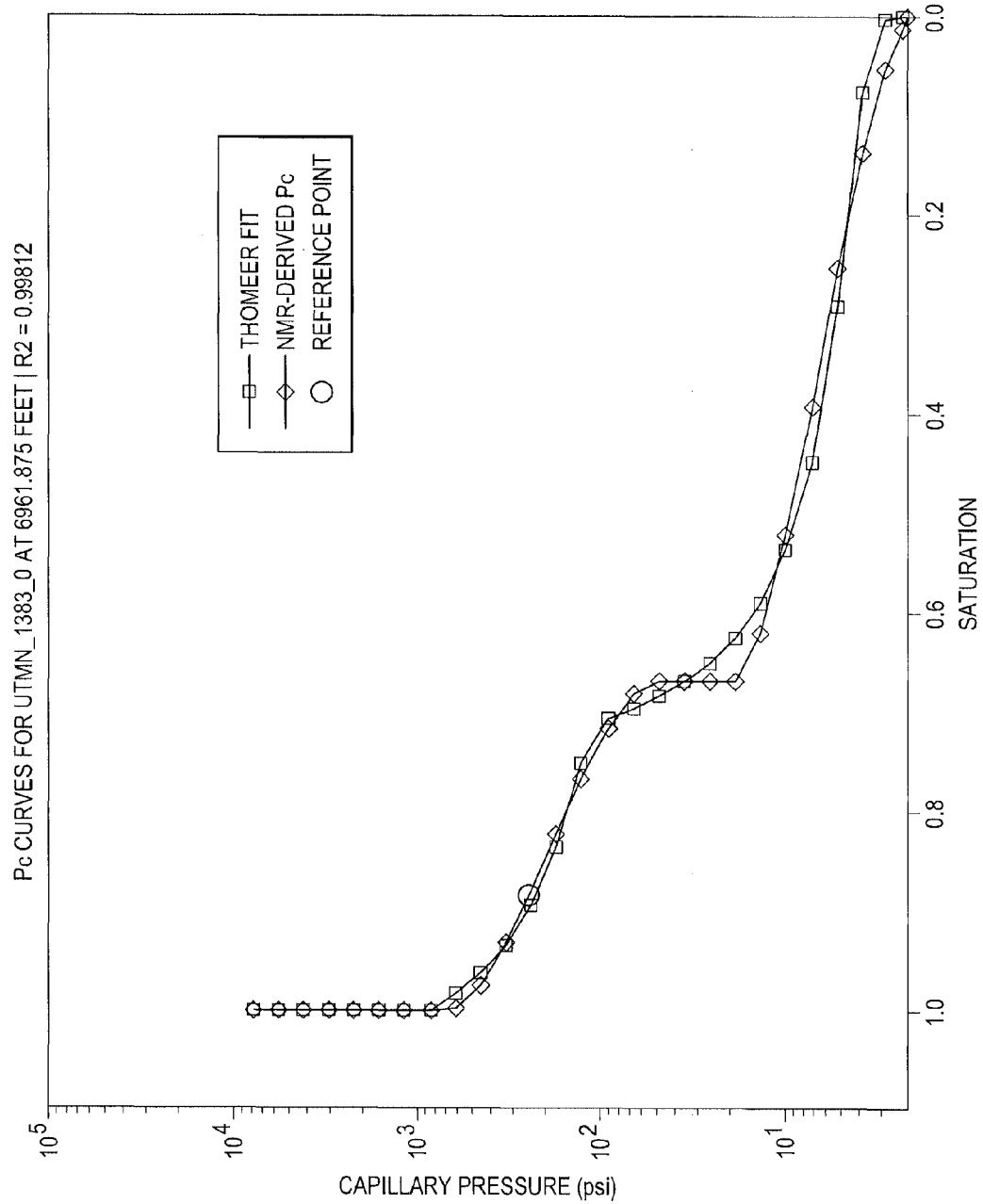

FIG. 14 and FIG. 15 show the corresponding capillary pressure curves from the NMR derivation and Thomeer fitting on a log-log scale and semi-log scale, respectively. Note that the two pore systems are also represented in the capillary pressure curves. The total bulk volume obtained from the Thomeer fit is 28.66%, which is comparable to the wireline porosity considering Thomeer bulk volume is usually 1.1 times the real porosity. The Thomeer water saturation at the reference point is 11.77%, which is similar to the wireline calculated one.

The results are considered to be very good because they are obtained from excellent raw data. However, note that the NMR data shows large amplitudes with relaxation time bigger than 33 msec, i.e. in the free fluid zone (FIG. 5). On the other hand, the NMR-derived capillary pressure and its Thomeer fit do not identify the first pore system (due to the relatively high entry pressure). This may suggest that the calibration factor used is possibly not accurate.

Case 2

Figure 16:
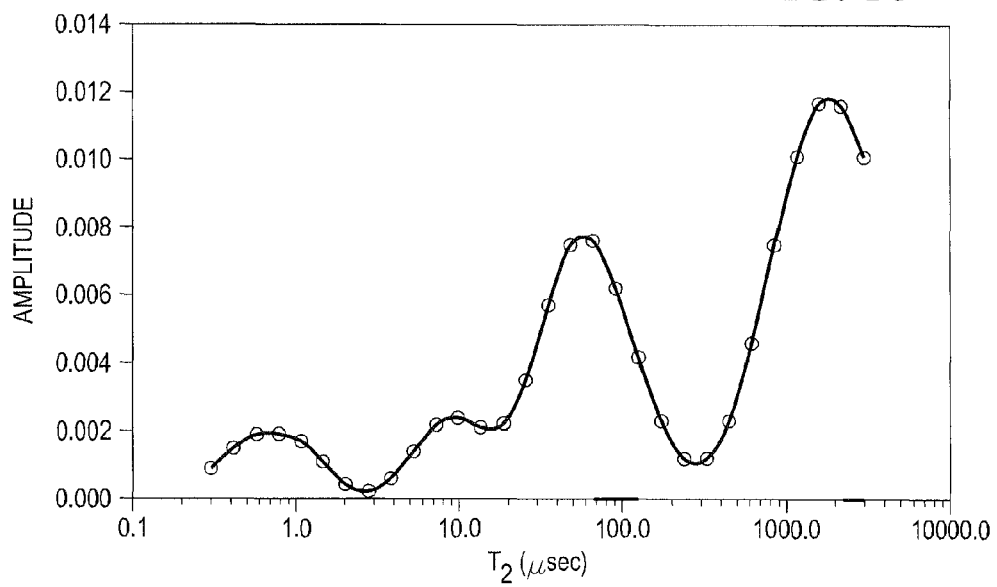
FIG. 16 is a plot of an example bimodal wireline NMR response obtained during another field test according to the present invention.

FIG. 16 shows a case with at least three pore systems. The sample was taken from a rock sample obtained at a measured depth of 6991.25 feet. Note that the NMR is clipped at largest pore system. The wireline porosity and water saturation were determined to be 24.65% and 13.56%, respectively. Table 3 shows the optimized Thomeer parameters for this case.

TABLE 3

| | Pore System 1 | | Pore System 2 | | Pore System 3 |
|---|---|---|---|---|---|
| $Bv_1$ | 0.1571 | $Bv_2$ | 0.0663 | $Bv_3$ | 0.0505 |
| $G_1$ | 0.1704 | $G_2$ | 1.2000 | $G_3$ | 0.2209 |
| $Log\ Pd_1$ | 1.5487 | $Log\ Pd_2$ | 2.4758 | $Log\ Pd_3$ | 2.9020 |

Figure 17:
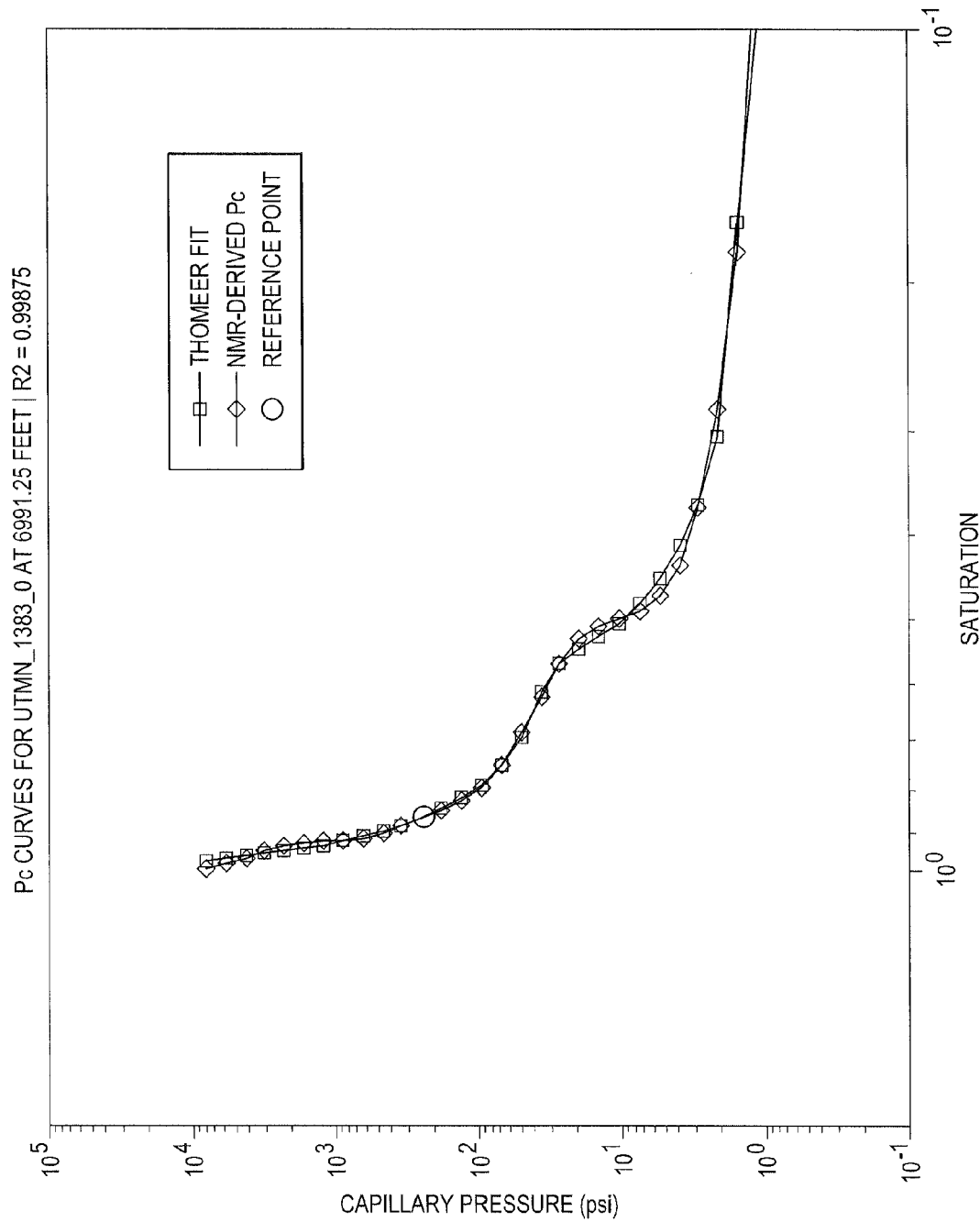
FIGS. 17 and 18 are plots of NMR-derived capillary pressure and an optimized Thomeer fit obtained according to the present invention from the NMR response data of FIG. 16.
Figure 18:
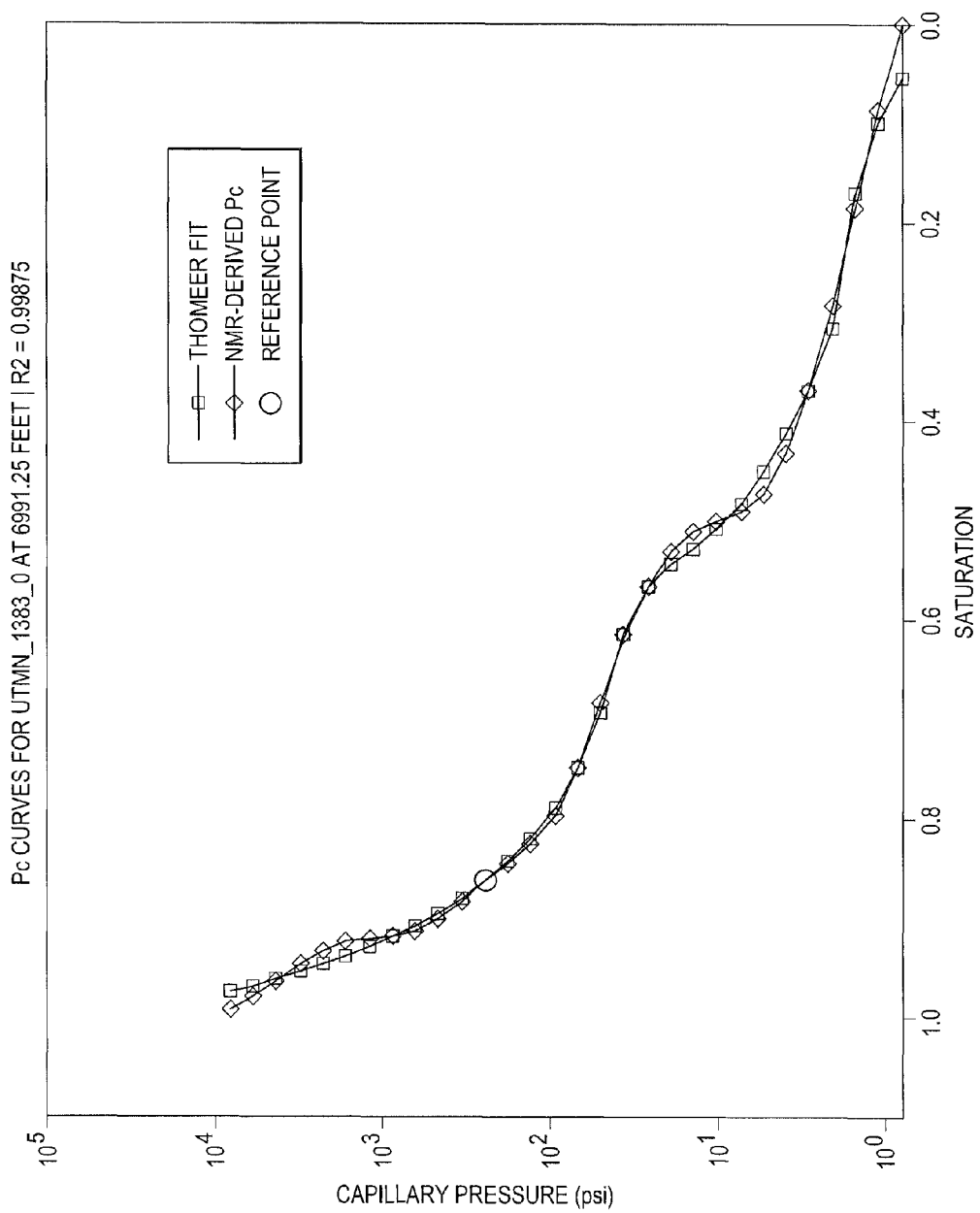

Note that the optimization is designed for a maximum of three pore systems. FIGS. 17 and 18 show the NMR-derived capillary pressure and its Thomeer fit plotted on a log-log and semi-log scales, respectively. The total bulk volume and the water saturation for the reference point from the Thomeer fit is 27.39% and 13.13%, respectively.

NMR. Data Quality

As with any wireline data, NMR data can be inaccurate if the wellbore is not in a good condition. An so, the use of conventional means to assess the hole condition is essential, for example, by using caliper log to identify cave in zones. Such intervals need to be excluded from the analysis.

If bad quality data is included in the analysis, it can be easily excluded afterwards by calculating the correlation coefficient between the Thomeer fit and the NMR-derived capillary pressure curve. In addition, a comparison of the reference and the Thomeer water saturation at the reference point is useful for identifying these anomalous data. Generating a crossplot of this for the whole interval for different wells is very useful for identifying the wells with bad quality NMR.

In addition, if the NMR signal is recorded over a short period of time, the whole signal spectral can be missed. Commonly, the recorded range of relaxation time is between 0.3 and 3000 msec. This might not be enough time to relax some of the protons in vuggy intervals. Using the methodology of the present invention without reconstructing the missing data may yield inaccurate results. In particular, the smaller pores may likely be over-estimated which would result in relatively higher capillary pressure curves.

To remediate this, a longer time period can be recorded for intervals being suspected of having vuggy porosity. If that is not possible, a Gaussian distribution can be used to interpolate the missing time interval.

Method Validation

Validation of the workflow presented in this study is difficult. Capillary pressure curves from different methodologies, be it MICP experiment, pore network simulation, or NMR derivation are of different scales. And so, it is expected that they will produce different results. In addition, the intervals studied in this paper did not have MICP data. That being said, the results acquired are sensible and fit perfectly with the available data, e.g. wireline derived water saturation and porosity values.

Diffusion and Bulk Effect of NMR Transverse Time Response

A Simplified NMR response (Equation 4) was used in the analysis by ignoring diffusion and bulk relaxation effect. The bulk relaxation time is relatively large at reservoir conditions and so its term in can be ignored in Equation 4. Situations have been identified where bulk relaxations cannot be ignored: water in larger pores such as vugs, oil relaxation in a water wet-rock, and if there paramagnetic ions (such as manganese) in the water are significantly present. The presence paramagnetic ions might occur depending on the mud filtrate used and the procedures prior to NMR logging.

Diffusion relaxation is negligible if the magnetic field stays constant. Practically, the diffusion effect can be minimized by using a low echo spacing, which corresponds to the T parameter in Equation 3. By doing so, diffusion relaxation effect can be ignored. If these conditions are not met, the model presented does not hold.

Hydrocarbon Effect on NMR Response

NMR response can be greatly affected by hydrocarbon accumulations. This will invalidate the assumption that the response is directly reflecting the pore-body distribution of the rock. That is because the hydrogen relaxation time the hydrocarbon depends on the intrinsic properties of the fluid and not the pore size. Empirically derived correction for the hydrocarbon effect has been applied in the past with success. The method used in based on an empirical correlation between the geometrical mean of the relaxation time at 100% water saturation and the irreducible water saturation value.

More recently, tools and acquisition parameters that results in a small radius of investigation around the wellbore have been used. This insures that the NMR response captured is actually is mainly from the invaded zone which is theoretically filled with water if a water based drilling system was used. Flushing the borehole with water might be a good idea to obtain a representative signal of pore-geometry.

Figure 19:
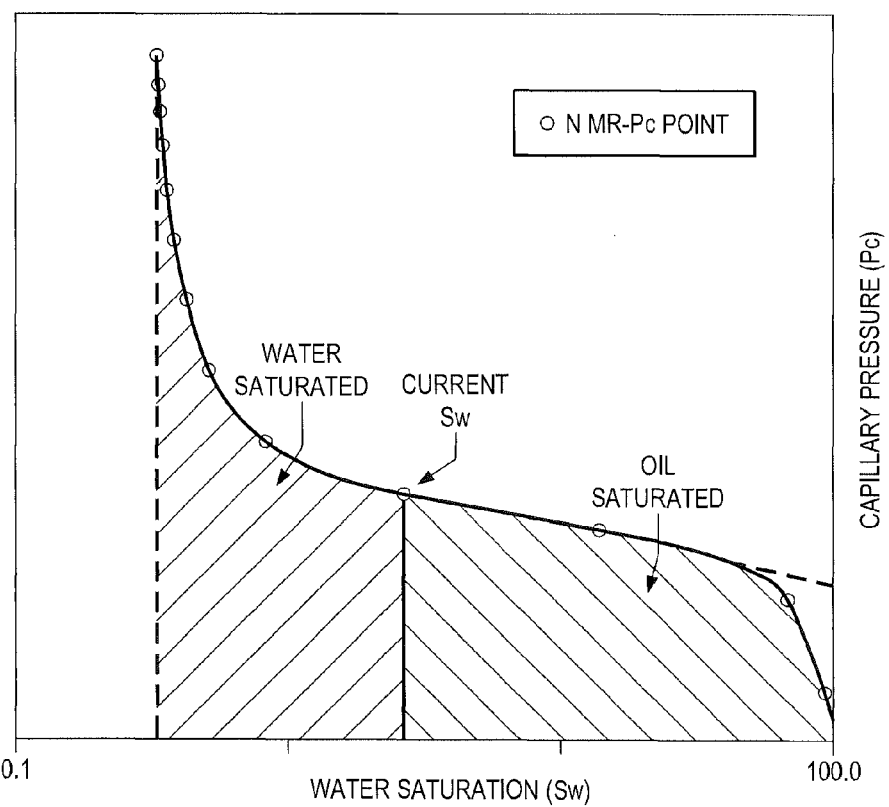
FIG. 19 is a schematic diagram of a capillary pressure curve in a light-oil water wet system.

Finally, if the reservoir in completely water-wet and contains light oil, a simple cutoff point can be applied. The cutoff will be based on the current saturation cutoff obtained from wireline log analysis (FIG. 19). This is possible because the ultimate objective is to model Thomeer parameters over the NMR-derived capillary pressure curves. However, low water saturated intervals might produce in accurate results because much of the curve is excluded from the analysis. In addition, this procedure assumes that hydrocarbon accumulation will always exist in the pores with largest throats and water in the ones with smaller ones.

Figure 20:
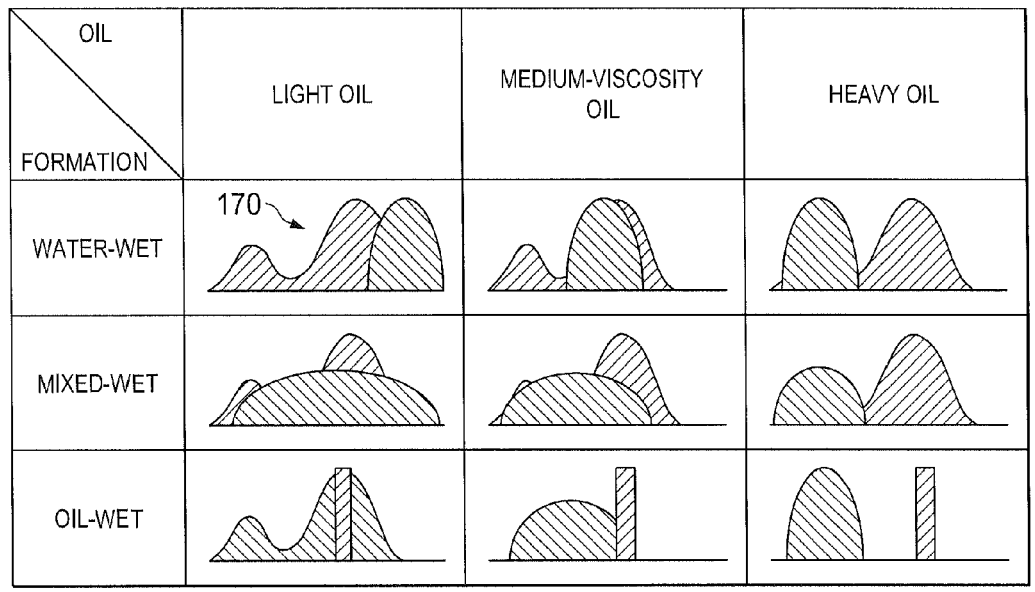
FIG. 20 is a schematic diagram illustrating NMR signal composition for various hydrocarbon types and wetting.

The present invention is also not adapted for certain other reservoir systems, such as when the oil signal in the NMR is not distinct. For example, heavy oil will have very short relaxation time which means that its signal will affect the high capillary pressure values side curve. FIG. 20 illustrates the position of the hydrocarbon and water signals depending on the wetting and hydrocarbon type. Note that as indicated at 170 the only scenario where the hydrocarbon is truly represented by long relaxation time is when the system has light oil and is water-wet.

Coupling of Pores

The assumption that the NMR signal reflects distinct pores is not valid if there is pore coupling in the system. This is because hydrogen atoms sample multiple pores. Studies have shown that pore coupling in the NMR signal depends on the diffusion length and the spacing between dissimilar pores. Coupling will occur if the diffusion length is greater than the spacing between pores because protons will travel through multiple pores before relaxing. If this is the case, then inaccurate results may occur because each relaxation time does not reflect one distinct pore size. For example, the signal from bimodal rocks may appear mono-modal.

The Washburn Equation

To develop the conversion, the Washburn equation (Equation 1) was used. The equation assumes a cylindrical system. This might be valid for some of the rocks, such as some of the clastics, but it may not be valid for other rocks. More complex relationships between pore-body and pore-throat are certainly observable. A number of modifications for the equation to account for more complex structures and different effects have been suggested in the published literature. Thus, it should be understood that the modifications of the Washburn equation are also suitable for use according to the present invention.

That being stated, the Washburn equation is an accepted model for converting capillary pressure to pore-throat distributions and thus, it is used in laboratory MICP analysis too. In addition the calibration constant that is calculated might account for irregular geometries and pore-body pore-throat relationships even if the Washburn equation does not hold entirely. For those reason, it seems reasonable to use the unmodified version of the Washburn of Equation (1).

NMR-Pc Calibration

The use of a specific reference Pc-Sw point at each depth of interest would allow for possibility of calculating a calibration constant for each specific depth. A desirable result of this is that rock heterogeneity will be accounted for in terms of pore-body pore-throat relationships. Thus, no extensive petrophysical rock typing is required. However, it also means that the calibration constant value will be highly dependent on the input from each depth, i.e. inaccurate inputs can results in inaccurate reference Pc-Sw point which will result in an inaccurate calibration value. An average calibration factor for an interval can be calculated, if desired, in order to smooth some of the error associated with inaccurate relaxation time spectrum.

There are other advantages for using the reference point method. One is the fact that the resulting calibrated capillary pressure will be consistent with the already available wireline data, specifically water saturation. Another is the fact that the calculated reference point is at comparatively similar scale with the NMR data (about half a foot) which is close to the vertical scale used in the current reservoir simulators. The laboratory and image-derived MICP methods are usually done on a much smaller scale (commonly a rock plug or a rock chip from the plug). Finally, because the methodology of the present invention uses the already available logs and datasets, it is cheap, very fast, and can be applied on every interval where NMR data is available.

Figure 21:
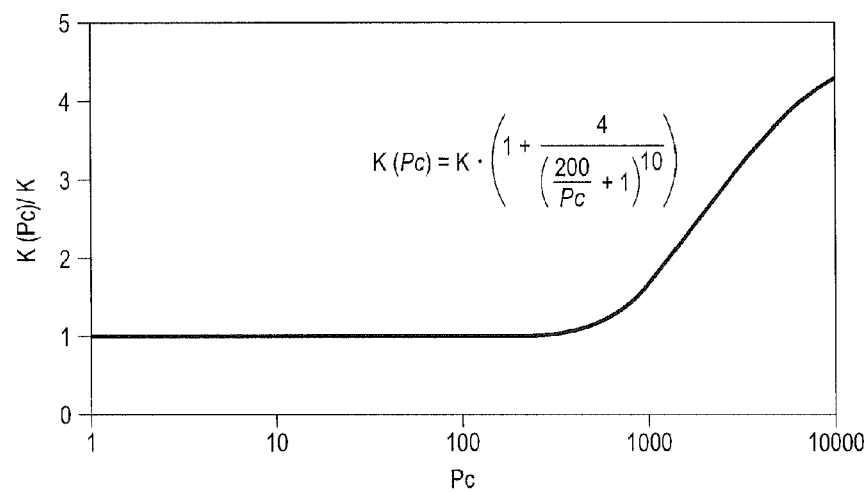
FIG. 21 is a plot of an example of a nonlinear NMR to capillary pressure scaling function.

The methodology described herein has assumed a linear relationship between the pore-body and pore-throats. This may not be the case for rocks with complex pore geometries. A scaling function known in the art may be used to mimic the effect of irreducible water saturation. An example is given in Equation 18.

$$\kappa(Pc) = \kappa \cdot \left(1 + \frac{4}{\left(\frac{200}{Pc} + 1\right)^{10}}\right) \quad (18)$$

where $\kappa(Pc)$ is the Pc-dependent calibration factor and $\kappa$ is the original calibration factor at low Pc values. FIG. 21 shows a plot of this function. The scaling can, if needed, be easily integrated into the workflow.

Table 4 compares different data sources for calibration purposes. An advantage of the use of laboratory or image derived MICP data is that multiple points can be used for calibration. Effectively, the non-linear calibration constant can be determined empirically for the sample analyzed.

TABLE 4

| Calibration From | Laboratory MICP | Image-Derived MICP | Sw-Pc Reference Point |
|---|---|---|---|
| # of points used in Calibration | Multiple | Multiple | One Point |
| Accuracy | Relatively accurate | Can be inaccurate | Can be inaccurate |
| Requirements | Physical rock sample | Physical rock sample | Wireline logs |
| Availability of dataset | Sparse dataset | Relatively large dataset | Relatively complete dataset |
| Efficiency | Relatively expensive and slow | Relatively inexpensive and fast | Cheap and fast |

Figure 22A:
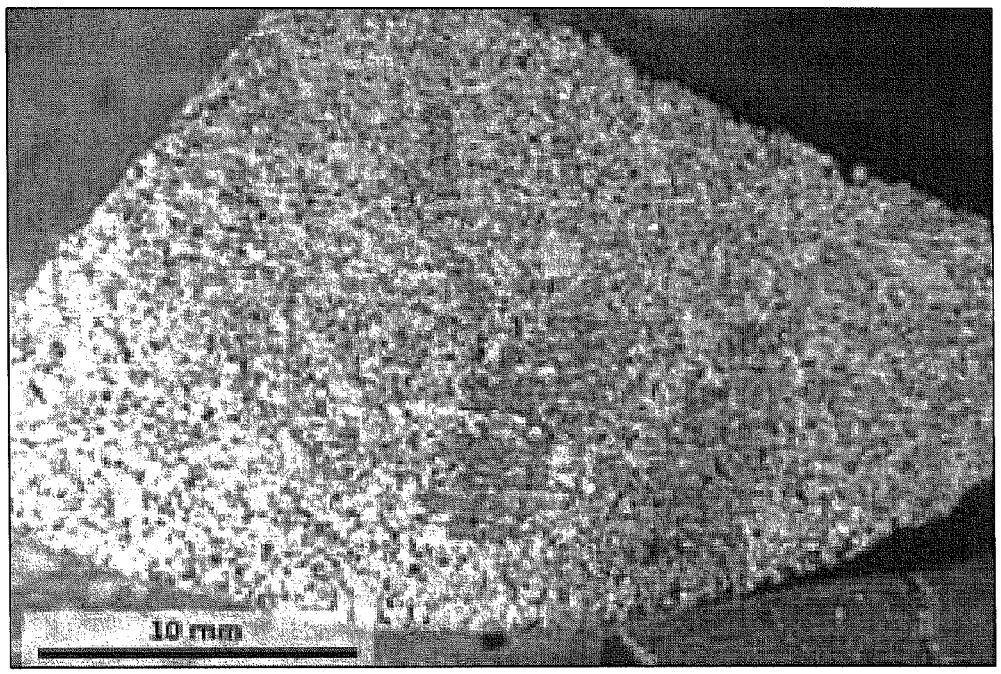
FIGS. 22A, 22B, 22c and 22D are photographic images of a rock chip.
Figure 22B:
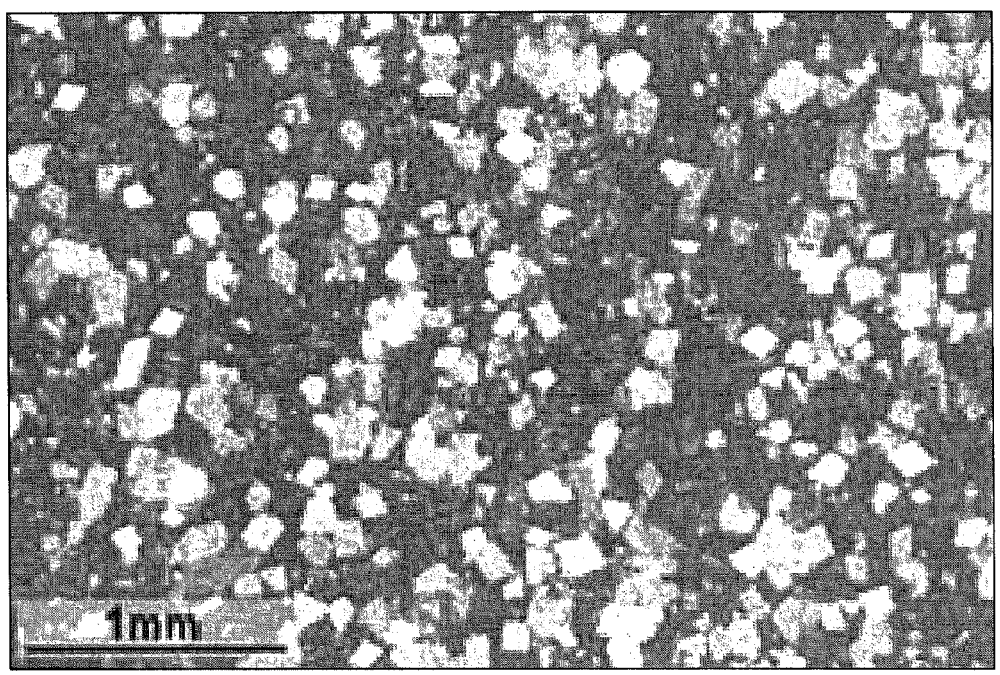
Figure 22C:
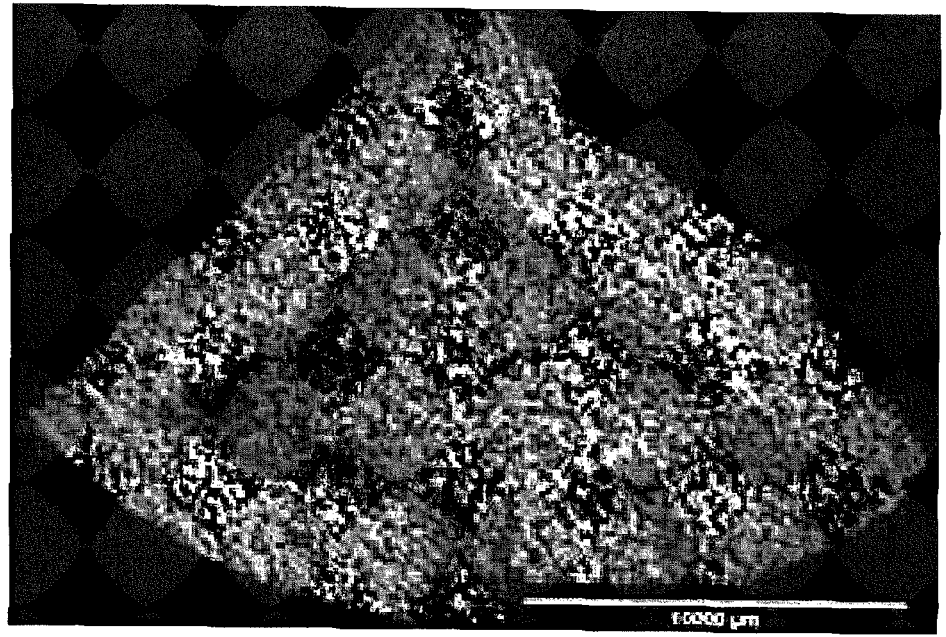
Figure 22D:
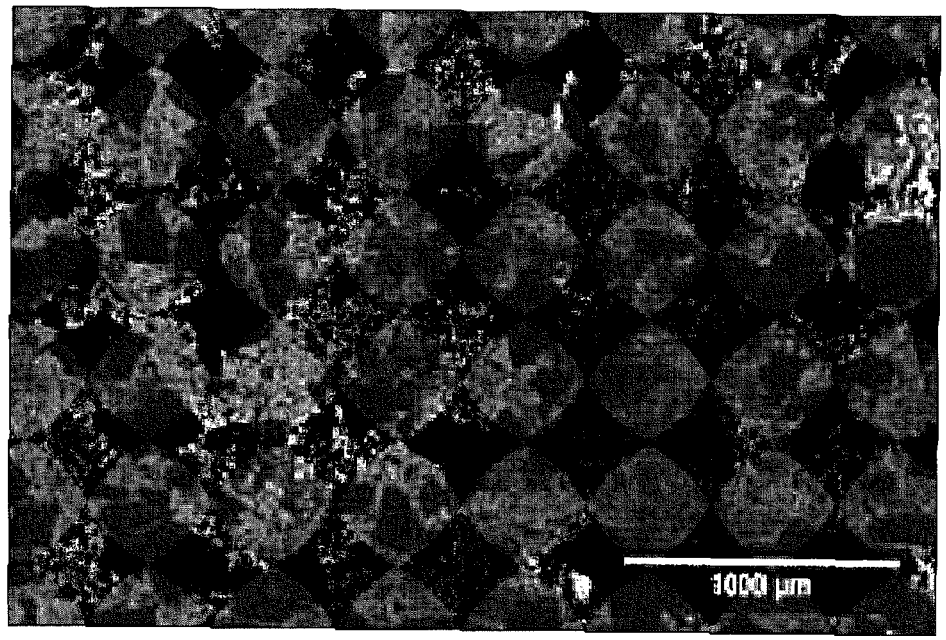

FIGS. 22A through 22D show an example of micritic dolomite rock. The helium porosity for this sample is 20.7% and the permeability is 8.3 mD. FIG. 22A is a standard digital camera image of the rock chip, while FIG. 22B is a thin section image. FIG. 22C is an overview confocal image, and FIG. 22D is a close-up confocal image.

Figure 23:
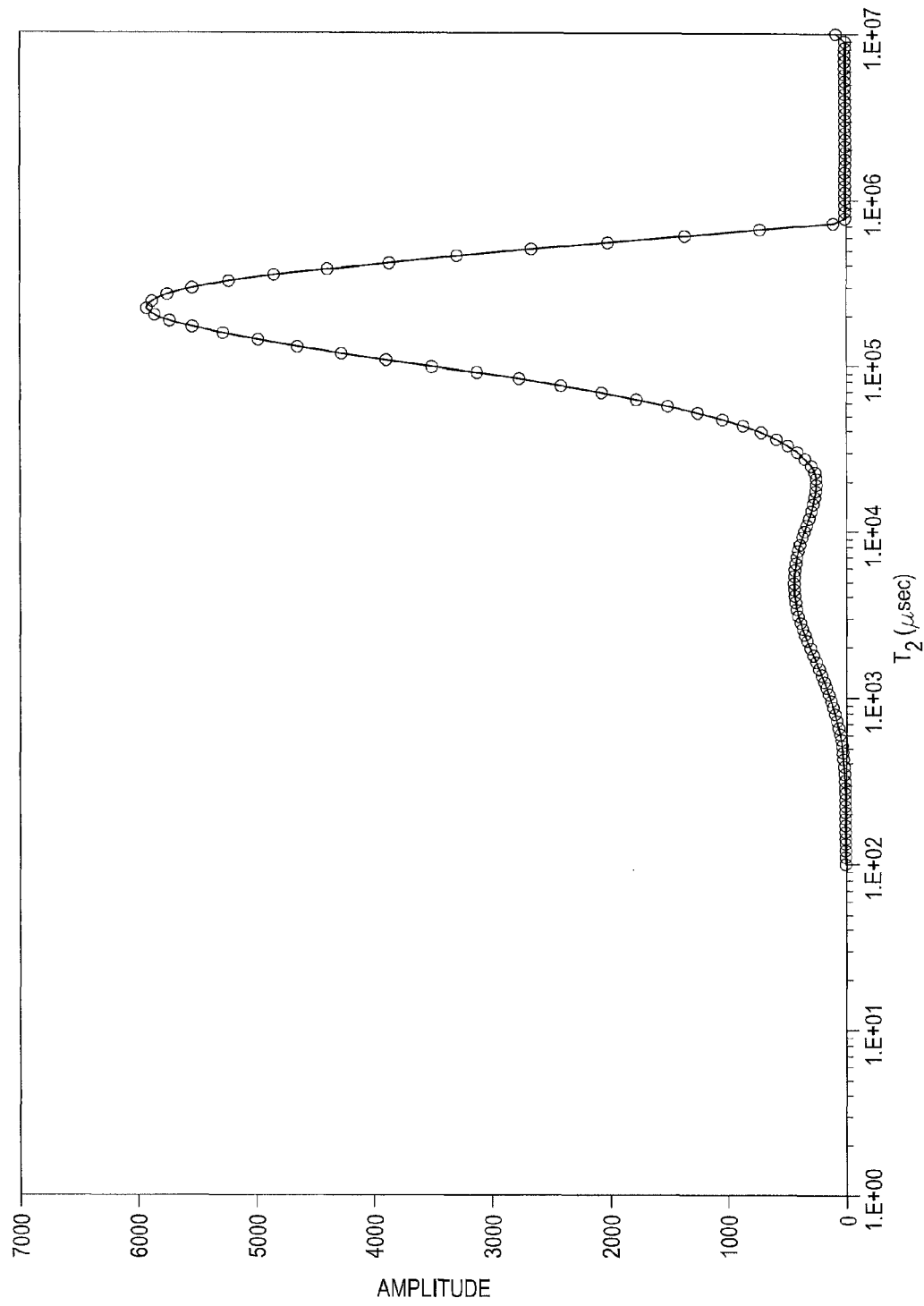
FIG. 23 is plot of laboratory NMR results from the rock in which the data of FIG. 13 were obtained.
Figure 24:
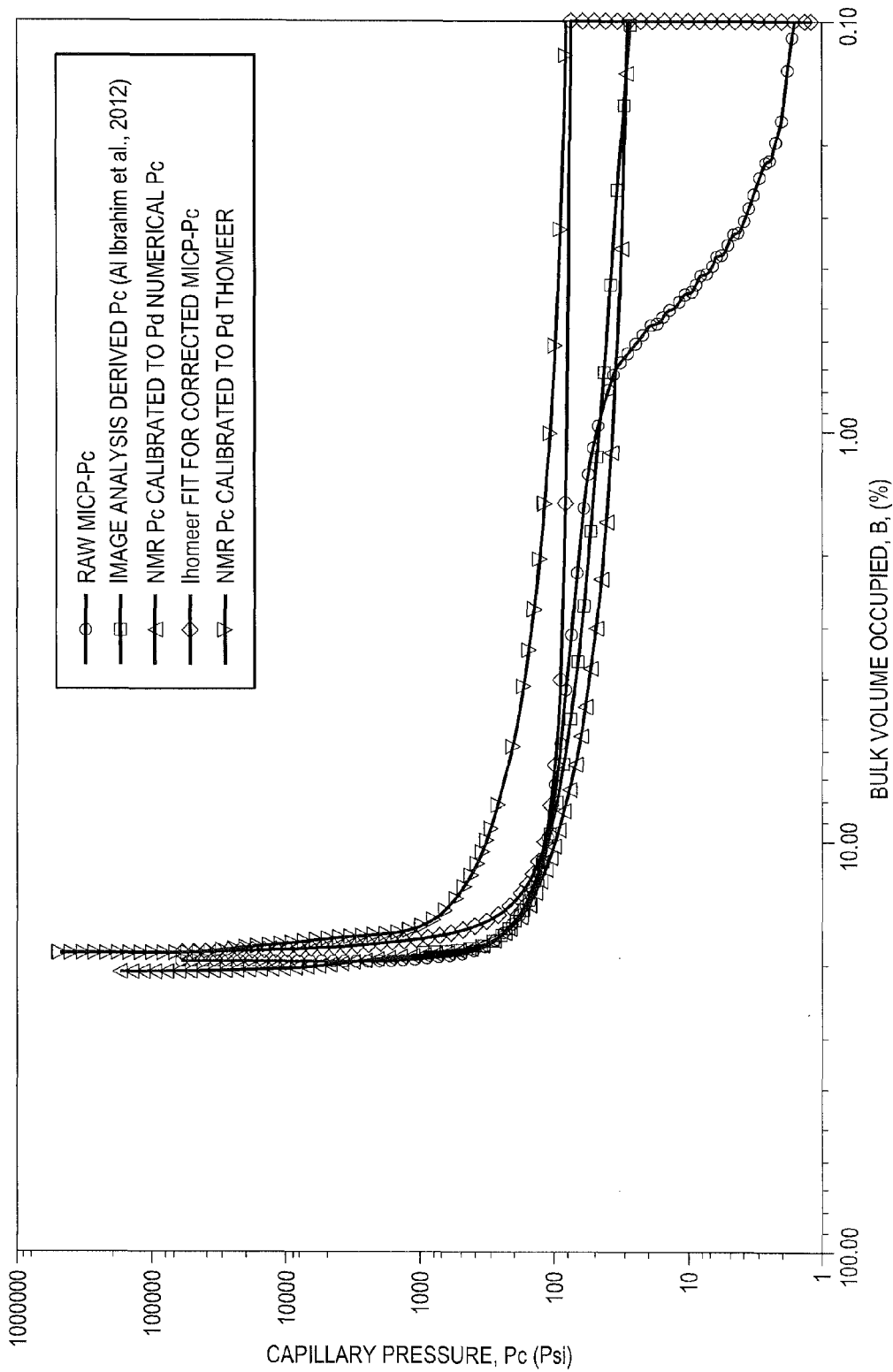
FIG. 24 is a comparative plot of capillary pressure curves obtained by various methods.

FIG. 23 shows the laboratory NMR results. Laboratory measured capillary pressure using an MICP experiment, image analysis derived capillary pressure using known techniques, and NMR-derived capillary pressure according to the present invention are shown. A number of attempts were made to calibrate the NMR-derived capillary pressure curve using the entry pressure. The best fit is obtained which matched the raw MICP and image-driven results (FIG. 24). No non-linear calibration was needed. Note however, that this rock is mono-modal. More complex rocks might need to have such a calibration function.

Thomeer Fit Optimization

The optimization used in this study is a local optimization, i.e. it starts with on initial guess and searches for the neighboring local minimum. Generally, it should converge correctly if a good range for the parameters and an adequate initial guess are used. The Thomeer parameters are generally constrained and so the objective function usually behaves as expected. However, in rare cases, the objective function will not converge because it reaches a plateau. A workaround to this is to design a mapping experiment to determine the best initial guess, i.e. search for the global minimum in the objective function. However, because such mapping is computationally expensive and the fact that non-convergent cases are not of importance physically, disregarding mapping seems like the sensible option.

The initial Thomeer parameters and the ranges used are important for obtaining accurate results. If the reservoir is mature and relatively understood, values can be assigned based on the data available of MICP curves. Otherwise, analogs and knowledge of Thomeer parameters can be used to estimate them. Generally, if a sensible range, results should be consistent over different initial values. Note that other physically determined parameters such as fluid densities can be also measured or estimated.

In addition, a number of internal parameters can affect the Thomeer fit results. These parameters are hard to quantify physically and so determining the best values to use might be difficult. Examples of such parameters are values related to the smoothing in the Thomeer construction code. Extra care must be taken when dealing with these values. Generally, the default values are used. Visual inspection of the converted capillary pressure curve and the corresponding Thomeer fit can help in determining the best values.

Figure 25:
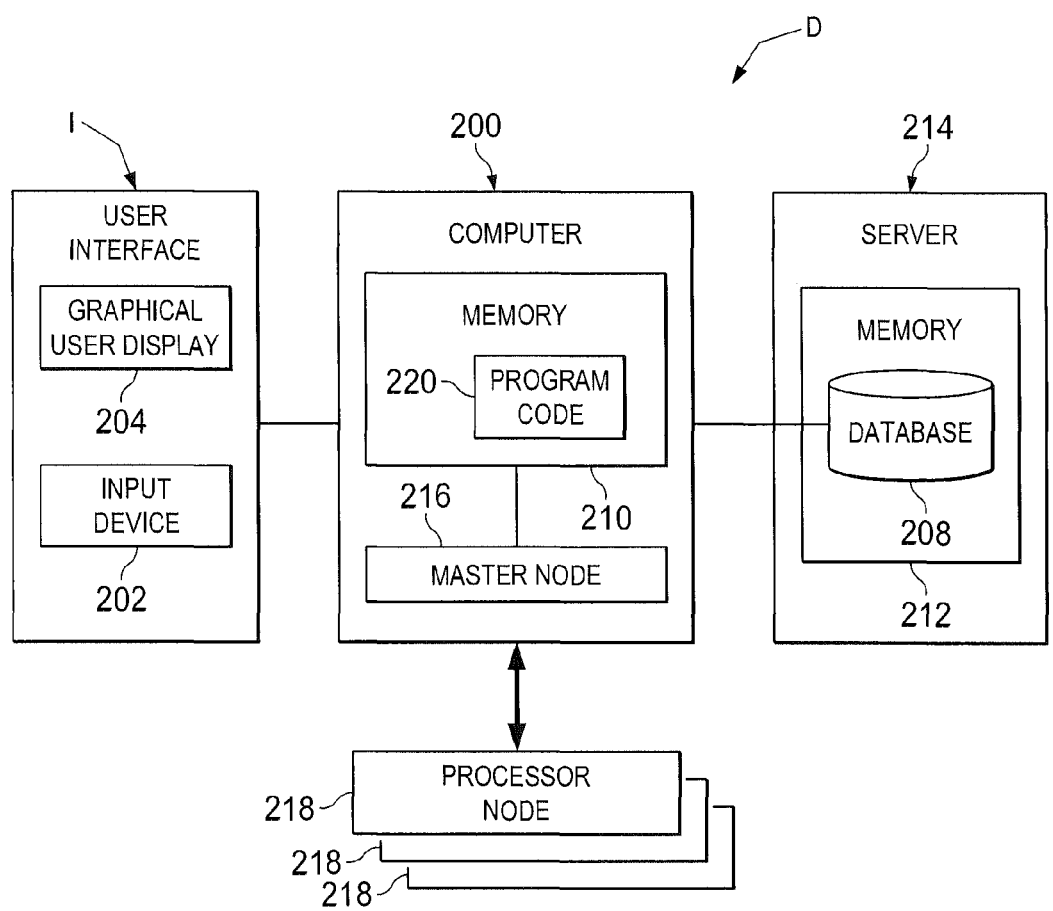
FIG. 25 is a schematic block diagram of a data processing system determining continuous capillary pressure curves for subsurface earth formations according to the present invention.

Turning to FIG. 25, a data processing system D is shown which determines continuous capillary pressure curves for subsurface earth formations according to the present invention. The data processing system D includes a computer 200 which may be a multicore processor with nodes such as those from Intel Corporation or Advanced Micro Devices (AMD), an HPC Linux cluster computer or a mainframe computer of any conventional type of suitable processing capacity such as those available from International Business Machines (IBM) of Armonk, N.Y. or other source. The data processing system D may also be a computer of any conventional type of suitable processing capacity, such as a personal computer, laptop computer, or any other suitable processing apparatus. It should thus be understood that a number of commercially available data processing systems and types of computers may be used for this purpose.

Figure 10C:
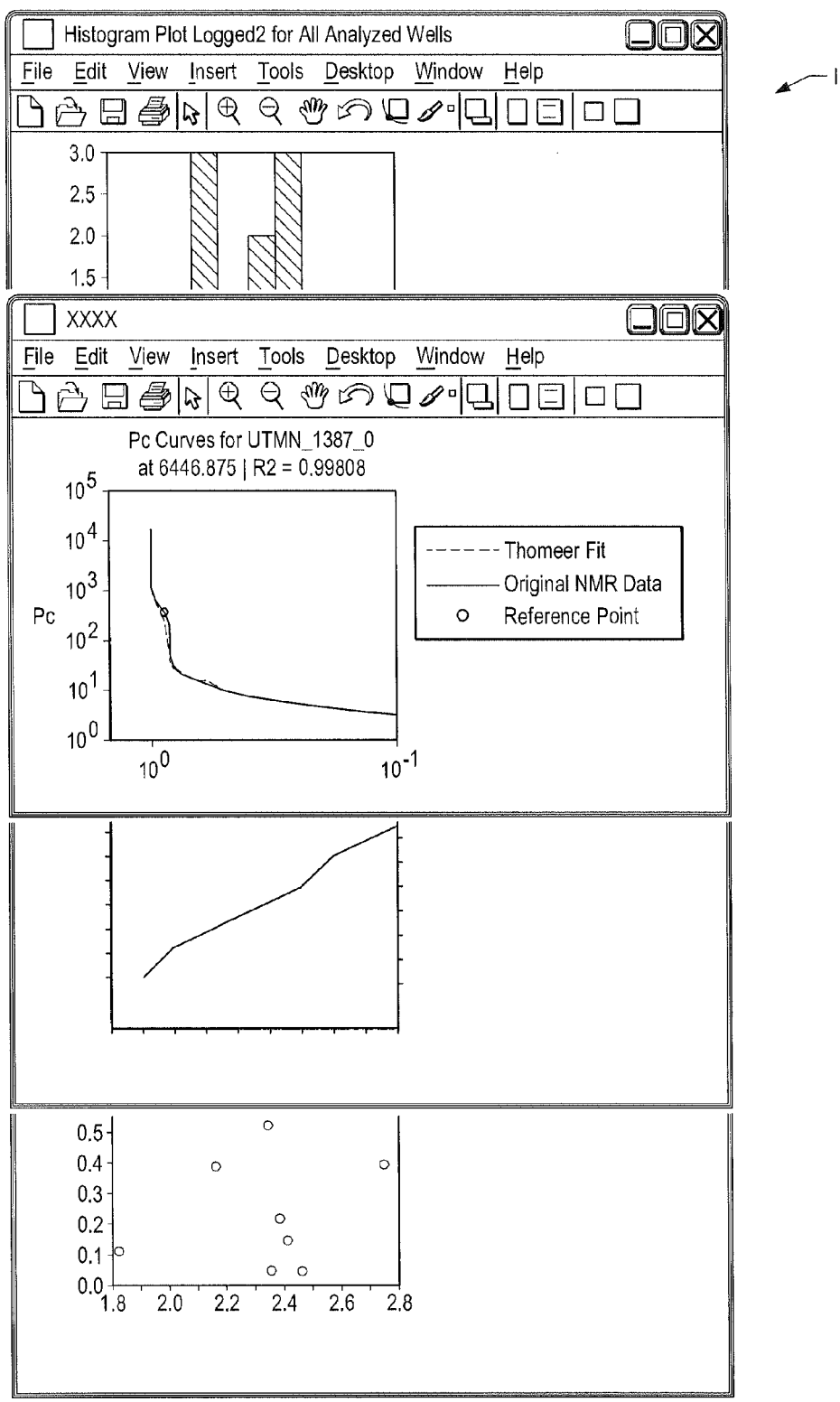
FIG. 10 is a diagram of a user interface for a computer according to the present invention.

The user interface I for computer 200 has an input device 202 and an output data display 204 for displaying output data or records such as that shown in FIG. 10 of continuous capillary pressures at depths of interest for subsurface earth formations according to the present invention. The output display 204 includes components such as a printer and an output display screen capable of providing printed output information or visible displays in the form of graphs, data sheets, graphical images, data plots and the like as output records or images.

The input device 202 of computer 200 includes a suitable user input device or input/output control unit 206 to provide a user access to control or access information and database records and operate the computer 200. Data processing system D further includes a database 208 stored in computer memory, which may be an internal memory 210, or an external, networked, or non-networked memory as indicated at 212 in an associated database server 214. For a multicore processor, the computer 200 serves as a master node 216 with multiple processor nodes as indicated at 218.

The data processing system D includes program code 220 typically stored in memory 210 of the computer 200. The program code 220, according to the present invention is in the form of computer operable instructions causing the data processor 200 to perform the computer implemented method of the present invention in the manner described above and illustrated in FIGS. 9 and 12.

It should be noted that program code 220 may be in the form of microcode, programs, routines, or symbolic computer operable languages that provide a specific set of ordered operations that control the functioning of the data processing system D and direct its operation. The instructions of program code 220 may be stored in non-transitory form in memory 210 of the computer 200, or on computer diskette, magnetic tape, conventional hard disk drive, electronic read-only memory, optical storage device, or other appropriate data storage device having a computer usable medium stored in non-transitory form thereon. Program code 200 may also be contained on a data storage device such as server 214 as a non-transitory computer readable medium.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the process of the same, requires the claimed matter in the following claims; such structures shall be covered within the scope of the invention.

It should be noted and understood that there can be improvements and modifications made of the present invention described in detail above without departing from the spirit or scope of the invention.

What is claimed is:

1. A computer implemented method of obtaining measures in a data processing system of capillary pressure of pore systems in formation rock adjacent a well in a subsurface reservoir at a formation depth point of interest in the well, the method comprising the computer processing steps of:
   (a) receiving nuclear magnetic resonance well log data comprising transverse relaxation time amplitude distribution obtained from the formation by a nuclear magnetic resonance log of the well at the formation depth point of interest;
   (b) receiving resistivity well log data regarding the water saturation of the formation from measurements obtained from the formation by a resistivity well log of the well at the formation depth point of interest;
   (c) obtaining a measure of water saturation of the formation from the received resistivity well log data at the formation depth point of interest;
   (d) determining an initial measure of capillary pressure of the formation at the formation depth point of interest based on the received transverse relaxation time amplitude distribution;
   (e) performing a calibration of the initial measure of capillary pressure of the formation to a reference capillary pressure of the formation rock at the depth point of interest, the calibration being perform based on the measure of water saturation obtained from the received resistivity well log data from the formation at the depth point of interest;
   (f) forming a model of capillary pressure as a function of water saturation at the formation at the depth of interest;
   (g) testing the model of capillary pressure, and if the model of capillary pressure is acceptable, storing the tested model capillary pressure as the capillary pressure of the formation pore systems at the depth of interest; and
   (h) forming an output display of the accepted capillary pressure of the formation pore systems at the depth of interest for reservoir simulation.

2. The computer implemented method of claim 1, wherein the step of receiving nuclear magnetic resonance well log data comprises the step of:

receiving nuclear magnetic resonance well log data regarding a plurality of depths of interest in the formation.

3. The computer implemented method of claim 2, wherein the step of receiving resistivity well log data regarding the water saturation of the formation comprises the step of:
receiving resistivity well log data regarding the water saturation at a plurality of depths of interest in the formation.

4. The computer implemented method of claim 3, wherein the step of determining an initial measure of capillary pressure of the formation comprises the step of:
determining an initial measure of capillary pressure of the formation at a plurality of depths of interest in the formation.

5. The computer implemented method of claim 4, wherein the step of performing a calibration of the initial measure of capillary pressure comprises the step of:
performing a calibration of the initial measure of capillary pressure at a plurality of depths in the formation to a postulated capillary pressure at a plurality of depths in the formation.

6. The computer implemented method of claim 5, further including the step of:
storing a record of the postulated capillary pressure at a plurality of depths in the formation.

7. The computer implemented method of claim 6, further including the step of:
forming an output display of the postulated capillary pressure at a plurality of depths in the formation.

8. The computer implemented method of claim 1, wherein the accepted capillary pressure of the formation pore systems at the depth of interest comprises formation cumulative bulk percentage and entry pressure.

9. A data processing system for obtaining measures in a data processing system of capillary pressure of pore system in formation rock adjacent a well in a subsurface reservoir at a formation depth point of interest in the well, the data processing system comprising:
(a) a processor performing the steps of:
(1) receiving nuclear magnetic resonance well log data comprising transverse relaxation time amplitude distribution obtained from the formation by a nuclear magnetic resonance log of the well at the formation depth point of interest;
(2) receiving resistivity well log data regarding the water saturation of the formation from measurements obtained from the formation by a resistivity well log of the well at the formation depth point of interest;
(3) obtaining a measure of water saturation of the formation from the received resistivity well log data at the formation depth point of interest;
(4) determining an initial measure of capillary pressure of the formation at the formation depth point of interest based on the received transverse relaxation time amplitude distribution;
(5) performing a calibration of the initial measure of capillary pressure of the formation to a reference capillary pressure of the formation rock at the formation depth point of interest, the calibration being performed based on the measure of water saturation obtained from the received resistivity well log data from the formation at the depth point of interest;
(6) forming a model of capillary pressure as a function of water saturation at the formation at the depth of interest;

(7) testing the model of capillary pressure, and if the model of capillary pressure is acceptable, storing the tested model capillary pressure as the capillary pressure of the formation pore systems at the depth of interest; and
(b) an output display forming a display of accepted capillary pressure of the formation pore systems at the depth of interest for reservoir simulation.

10. The data processing system of claim 9, wherein the processor in receiving nuclear magnetic resonance well log data from measurements obtained from the formation by nuclear magnetic resonance log from the well performs the step of:
receiving nuclear magnetic resonance well log data regarding a plurality of depths of interest in the formation.

11. The data processing system of claim 10, wherein the processor in receiving resistivity well log data regarding the water saturation of the formation performs the step of:
receiving resistivity well log data regarding the water saturation at a plurality of depths of interest in the formation.

12. The data processing system of claim 11, wherein the processor in determining an initial measure of capillary pressure of the formation performs the step of:
determining an initial measure of capillary pressure of the formation at a plurality of depths of interest in the formation.

13. The data processing system 12, wherein the processor in performing a calibration of the initial measure of capillary pressure performs the step of:
performing a calibration of the initial measure of capillary pressure at a plurality of depths in the formation to a postulated capillary pressure at a plurality of depths in the formation.

14. The data processing system of claim 13, wherein the output display forms an output display of the postulated capillary pressure at a plurality of depths in the formation.

15. The data processing system of claim 9, further including:
a memory storing a record of the accepted capillary pressure of the formation pore systems at the depth of interest for reservoir simulation.

16. The data processing system of claim 9, wherein the accepted capillary pressure of the formation pore systems at the depth of interest comprises formation cumulative bulk percentage and entry pressure.

17. A data storage device having stored in a computer readable medium computer operable instructions for causing a data processing system to obtaining measures in a data processing system of capillary pressure of pore systems in formation rock adjacent a well in a subsurface reservoir at a formation depth point of interest in the well, the instructions stored in the data storage device causing the data processing system to perform the following steps:
(a) receiving nuclear magnetic resonance well log data comprising transverse relaxation time amplitude distribution obtained from the formation by a nuclear magnetic resonance log of the well at the formation depth point of interest;
(b) receiving resistivity well log data regarding the water saturation of the formation from measurements obtained from the formation by a resistivity well log of the well at the formation depth point of interest;
(c) obtaining a measure of water saturation of the formation from the received resistivity well log data at the formation depth point of interest;

(d) determining an initial measure of capillary pressure of the formation at the formation depth point of interest based on the received transverse relaxation time amplitude distribution;

(e) performing a calibration of the initial measure capillary pressure of the formation to a reference capillary pressure of the formation rock at the formation depth point of interest, the calibration being performed based on the measure of water saturation obtained from the received resistivity well log data from the formation at the formation depth point of interest;

(f) forming a model of capillary pressure as a function of water saturation at the formation at the depth of interest; and (g) testing the model of capillary pressure, and if the model capillary pressure is acceptable, storing the tested model capillary pressure as the capillary pressure of the formation pore systems at the depth of interest; and (h) forming an output display of the accepted capillary pressure of the formation pore systems at the depth of interest for reservoir simulation.

18. The data storage device of claim 17, wherein the instructions for receiving nuclear magnetic resonance well log data include instructions causing the data processing system to perform the step of:

receiving nuclear magnetic resonance well log data regarding a plurality of depths of interest n the formation.

19. The data storage device of claim 18, wherein the instructions for receiving resistivity well log data regarding the water saturation of the formation include instructions causing the data processing system to perform the step of:

receiving resistivity well log data regarding the water saturation at a plurality of depths of interest in the formation.

20. The data storage device of claim 19, wherein the instructions for determining an initial measure of capillary pressure of the formation include instructions causing the data processing system to perform the step of:

determining an initial measure of capillary pressure of formation at a plurality of depths of interest in the formation.

21. The data storage device of claim 20, wherein the instructions for determining an initial measure of capillary pressure of the formation include instructions causing the data processing system to perform the step of:

performing a calibration of the initial measure of capillary pressure at a plurality of depths in the formation to a postulated capillary pressure at a plurality of depths in the formation.

22. The data storage device of claim 21, further including instructions for causing the data processing system to perform the step of:

storing a record of the postulated capillary pressure at a plurality of depths in the formation.

23. The data storage device of claim 17, wherein the accepted capillary pressure of the formation pore systems at the depth of interest comprises formation cumulative bulk percentage and entry pressure.

* * * * *